(12) United States Patent
Gilder et al.

(10) Patent No.: US 8,600,898 B2
(45) Date of Patent: Dec. 3, 2013

(54) ELECTRONIC PAYMENT SYSTEMS AND METHODS UTILIZING DIGITALLY ORIGINATED CHECKS

(75) Inventors: Clark S. Gilder, Alpharetta, GA (US); Michael G. Lalonde, Alpharetta, GA (US)

(73) Assignee: Global Standard Financial, Inc., Alpharetta, GA (US)

(*) Notice: Subject to any disclaimer, the term of this patent is extended or adjusted under 35 U.S.C. 154(b) by 207 days.

(21) Appl. No.: 11/869,739

(22) Filed: Oct. 9, 2007

(65) Prior Publication Data

US 2008/0249931 A1 Oct. 9, 2008

Related U.S. Application Data

(60) Provisional application No. 60/850,536, filed on Oct. 10, 2006.

(51) Int. Cl.
*G06F 21/00* (2013.01)
*G06Q 20/00* (2012.01)

(52) U.S. Cl.
USPC .............. 705/53; 705/54; 705/55; 705/63; 705/69

(58) Field of Classification Search
USPC ........................ 705/53–55, 63–69
See application file for complete search history.

(56) References Cited

U.S. PATENT DOCUMENTS

| | | | |
|---|---|---|---|
| 5,237,159 A | 8/1993 | Stephens | |
| 5,283,829 A | 2/1994 | Anderson | |
| 5,484,988 A | 1/1996 | Hills et al. | |
| 5,594,225 A | 1/1997 | Botvin | |
| 5,677,955 A | 10/1997 | Doggett et al. | |
| 5,783,808 A | 7/1998 | Josephson | |
| 5,848,400 A | 12/1998 | Chang | |
| 5,884,288 A | 3/1999 | Chang et al. | |
| 5,903,878 A | 5/1999 | Talati et al. | |
| 5,910,988 A | 6/1999 | Ballard | |
| 6,032,137 A | 2/2000 | Ballard | |
| 6,164,528 A | 12/2000 | Hills et al. | |
| 6,283,366 B1 | 9/2001 | Hills et al. | |
| 6,354,491 B2 | 3/2002 | Nichols et al. | |
| 6,411,942 B1 | 6/2002 | Fujimoto | |
| 6,547,129 B2 | 4/2003 | Nichols et al. | |
| 6,789,068 B1 | 9/2004 | Blaze et al. | |
| 6,990,224 B2 | 1/2006 | Warren et al. | |
| 7,089,208 B1 * | 8/2006 | Levchin et al. | 705/39 |
| 7,103,579 B1 | 9/2006 | Phillips et al. | |

(Continued)

OTHER PUBLICATIONS

Cook T. Going Totally Paperless. Independent Banker [serial online]. Nov. 2012. 62(11):50-51. Available from: Business Source Complete, Ipswich, MA. Accessed May 6, 2013.*

(Continued)

*Primary Examiner* — Thomas Dixon
*Assistant Examiner* — Nancy Mehta
(74) *Attorney, Agent, or Firm* — Clements Bernard PLLC; Lawrence A. Baratta, Jr.; Christopher L. Bernard

(57) ABSTRACT

The present invention provides a digitally originated check (DOC) through an electronic payment system (EPS) which captures payor metadata instructions regarding the intended payment to a payee. The metadata is stored in a database or the like for further processing instead of printing a paper check. The EPS is operable to clear the DOC through either paper or electronic Check 21 mechanisms.

19 Claims, 6 Drawing Sheets

(56) References Cited

U.S. PATENT DOCUMENTS

| | | | |
|---|---|---|---|
| 7,113,925 B2* | 9/2006 | Waserstein et al. | 705/50 |
| 7,131,571 B2 | 11/2006 | Swift et al. | |
| 7,175,074 B2 | 2/2007 | Mejias et al. | |
| 7,207,477 B1* | 4/2007 | Ramachandran | 235/379 |
| 7,231,068 B2 | 6/2007 | Tibor | |
| 7,925,588 B2* | 4/2011 | Foth | 705/45 |
| 2001/0029493 A1* | 10/2001 | Pare et al. | 705/64 |
| 2001/0044764 A1 | 11/2001 | Arnold | |
| 2002/0065786 A1 | 5/2002 | Martens et al. | |
| 2002/0120846 A1* | 8/2002 | Stewart et al. | 713/168 |
| 2003/0046229 A1 | 3/2003 | Cresswell | |
| 2003/0083967 A1 | 5/2003 | Fleming | |
| 2003/0093368 A1 | 5/2003 | Manfre et al. | |
| 2003/0187790 A1* | 10/2003 | Swift et al. | 705/40 |
| 2003/0187797 A1 | 10/2003 | Song et al. | |
| 2003/0220886 A1* | 11/2003 | Lam et al. | 705/71 |
| 2004/0199462 A1 | 10/2004 | Starrs | |
| 2004/0236688 A1 | 11/2004 | Bozeman | |
| 2005/0149439 A1* | 7/2005 | Suisa | 705/44 |
| 2005/0161502 A1 | 7/2005 | Smith, Jr. et al. | |
| 2006/0045321 A1 | 3/2006 | Yu | |
| 2006/0161501 A1 | 7/2006 | Waserstein et al. | |
| 2006/0273165 A1 | 12/2006 | Swift et al. | |
| 2007/0022053 A1 | 1/2007 | Waserstein et al. | |
| 2007/0130063 A1 | 6/2007 | Jindia et al. | |
| 2007/0175977 A1* | 8/2007 | Bauer et al. | 235/379 |
| 2007/0194102 A1 | 8/2007 | Cohen | |
| 2007/0271183 A1* | 11/2007 | Foth | 705/45 |
| 2007/0288380 A1 | 12/2007 | Starrs | |
| 2008/0249931 A1* | 10/2008 | Gilder et al. | 705/39 |
| 2009/0077046 A1* | 3/2009 | Narahara et al. | 707/3 |

OTHER PUBLICATIONS

Carter E, Parameswaran R. The Digital Market-Sphere (DMS): Modeling Virtual Transactons and Transvectons. Marketing Management Journal [serial online]. Spring 2012 2012; 22(1):122-158. Available from: Business Source Complete, Ipswich, MA. Accessed May 6, 2013.*

Malmfeldt, Sarah (2004-2005). 17 Loy. Consumer L. Rev. America Checks into a New Banking Era with Check 21. pp. 209-236.*

Murphy, "The Check Is in the Email", Bank Technology News, 12 (9): 49+, Sep. 1999. Copyright 1999 Thomson Media.

Doggett, "Electronic Checks—A Detailed Preview", Journal of Retail Banking Services, Summer 1996, vol. XVIII, No. 2, ABI/INFORM Global.

Cocheo, "One-Click check presentment", American Bankers Association, ABA Banking Journal, Nov. 2000, pp. 48,58-62.

* cited by examiner

*Figure 1*     *Prior Art*

ELECTRONIC PAYMENT SYSTEMS AND METHODS UTILIZING DIGITALLY ORIGINATED CHECKS

CROSS-REFERENCE TO RELATED APPLICATION(S)

The present non-provisional patent application claims priority to U.S. Provisional Patent Application Ser. No. 60/850,536, filed Oct. 10, 2006, and entitled "FINANCIAL PAYMENT SYSTEMS AND METHODS," the contents of which are incorporated in full by reference herein.

FIELD OF THE INVENTION

The present invention relates generally to financial payment systems and methods, and, more particularly, the present invention provides systems and methods for an Electronic Payment System (EPS) configured to utilize digitally originated checks to provide payment from a payor to a payee.

BACKGROUND OF THE INVENTION

Electronic commerce ("E-commerce") is proliferating. As such, various mechanisms have evolved for electronic payments between business, consumers, and the like. All payment systems in the United States fall under one or more "payment rails" with associated law, regulations, and rules. For example, payment rails include the checking system (regulated under UCC Articles 3 and 4, Check 21, Regulation CC, and the like), cash transfers (e.g., Western Union, Paypal, etc.), credit cards (regulated under Regulation Z), debit cards and Automatic Clearing House (ACH) (regulated under the Electronic Funds Transfer Act (EFTA)), wire transfers (regulated under UCC Article 4A), and the like. In general, each of these payment rails includes a transfer of monetary value, a transfer instrument(s), evidence of an obligation, devices for transmitting funds, rules regulating disputes, transferability to third parties, rules regulating time of payment, security, and the like.

Of note in the prior art is the wide use of ACH item origination and clearing (covered under the National Automated Clearinghouse Association (NACHA) rules, incorporated fully by reference here-in) using the concepts of Electronic Checks via POP, ARC, WEB or TEL SEC codes. These ACH items are a form of check truncation, not covered under Check 21, that allows payees to originate a payment item under agreement or published notice to the payors while performing some business service or selling goods or services to the payor at a point-of-sale terminal. These ACH items are not Check 21 UCC items but are commonly referred to as "electronic checks" by the various and wide spread NACHA marketing programs over the last ten years or more. Thus, under existing Ecommerce system interactions, payors are agreeing to pay their bills by using an ACH debit item that is prepared by the payee's backoffice business system. Of special note is the fact that the payors are not generating the ACH items themselves, rather they agree to have the payee truncate their check information to create the ACH item. The ACH payment is cleared using existing ACH clearinghouses and the like.

Checks are negotiable instruments regulated in the United States under the Uniform Commercial Code (U.C.C.) Articles 3 and 4. Traditionally, checks are paper instruments created by the payor filling in a pre-printed form on check stock paper where the payor inputs by handwriting, typing, or printing the required payment information. This paper check is then sent out using the mail, overnight delivery, hand delivery, or the like, but in the end the paper check is physically delivered directly to the payee to satisfy a debt. Upon receipt, the payee deposits the paper check into their bank for credit to their own account. The depositing bank bundles all of the paper checks together and send them to the banks' "Item Processing" department for processing (i.e., sorting, grouping and totaling) by high speed machinery. The purpose of this processing was to generate the necessary accounting entries needed to debit and credit the appropriate checking accounts and clear the payment. If the deposited check originated outside of the bank, the paper check would have to be forwarded for presentment to the originating (or paying) bank for payment.

Traditionally, paper checks moved from the Bank of First Deposit (BOFD) to a clearinghouse and then again from a clearinghouse to either another regional clearinghouse which was closer to the clearing bank (often times a Federal Reserve Bank in the issuing banks geographic area) or directly to the clearing bank. It is the clearing banks responsibility to validate the check, verify the account exists and has sufficient funds and then pay the BOFD so it may credit the account of the depositing payee.

Prior to the Check 21 Act, a bank that presents a check for payment was required to present the original paper check unless the clearing bank has agreed to accept alternative presentment from the depositing bank in some other form, such as electronic image exchange. §3-501(b)(2) and §4-110 of the Uniform Commercial Code (U.C.C.) specifically authorize banks and other persons to agree to alternative means of presentment, such as electronic image presentment. However, to truncate checks early in the collection process and engage in broad-based electronic presentment, a collecting bank would need electronic presentment agreements with each bank to which it presents checks for collection. This limitation proved impracticable because of both the large number of banks and the unwillingness of some paying banks to receive electronic presentment. As a result of the difficulty in obtaining the agreements necessary to present checks electronically in all cases, prior to the Check 21 Act, banks had not been able to take full advantage of the efficiencies and potential cost savings of handling checks electronically.

The Check Clearing for the 21st Century Act (Check 21) became effective on Oct. 28, 2004. Check 21 was designed to foster innovation in the payments system and to enhance efficiency by reducing some of the legal impediments to check truncation (i.e., eliminating a paper check by converting into a digital image and destroying the original paper item). The law facilitates check truncation by creating a new negotiable instrument called a substitute check, which permits banks to truncate original paper checks, to process check information electronically via exchange of check image files, and to deliver substitute checks to banks that want to continue receiving paper checks. A substitute check is created from a check image described by the X.9.37 'ANSI' draft standard or the X9.180 final standard, both of which are herein incorporated by reference in-full. This image file is a digital bitmap in Tagged Image File Format (TIFF) format created by electronically scanning and imaging the front and back of the original paper check. The substitute check (also known as an Image Replacement Document (IRD)), is created by printing the front and back images along with some additional information on an 8.5×11 inch sheet of paper. Under the Check 21 law, this IRD is treated as the legal equivalent of the original check and includes all the information contained on the original check. When printed, the images and data must conform to the X9.140 standard, which is herein incorporated by reference in-full. The law does not require banks to accept checks in electronic form nor does it require banks to use the new authority granted by the Act to create substitute checks.

A substitute check (or IRD) is a paper reproduction of an original check that contains an image of the front and back of the original check and is suitable for automated processing in the same manner as the original check. To clear a check for consideration of payment, the depositing bank transfers, presents, or returns the substitute check (or another paper or electronic representation of a substitute check, such as an Image and Cash letter file) and warrants that (1) the substitute check contains an accurate image of the front and back of the original check and a legend stating that it is the legal equivalent of the original check, and (2) no depositary bank, drawee, drawer, or endorser will be asked to pay a check that it already has paid. The substitute check for which a bank has made these warranties is the legal equivalent of the original check for all purposes and all persons.

Although Check 21 has facilitated the inter-bank exchange of electronic check images, it has not been fully utilized or enabled throughout the payment system due to a variety of security weaknesses or legal holes that are currently viewed to be either unsolvable or to be extreme business method barriers which would need to be overcome before a wider adoption of Check 21 imaging concepts can be implemented across the payments industry. First, in terms of general Check 21 industry implementation problems, frequently both the actual paper check and the Check 21 image may be cleared by the bank creating a double debit situation. Note that while the actual number of occurrences of these double debits has been reduced as banks improve their internal Check 21 business methods and systems, these same well known debit issues are generally unavoidable for any bank first implementing a Check 21 style image clearing process for either the forward or return clearing cycles. Second, a variety of security issues are of grave concern to banks given the entire loss of the existing paper security features which have been developed over the last 30 to 40 years. These image security holes show up primarily in the banking industry when they contemplate the concept of having a customer present an image to a bank to be settled as a UCC check payment. Consider for example, the case where a customer shows up with what looks like a Check 21 image in IRD form.

As currently viewed by the industry, anyone with a modest degree of skill in digital graphics editing can create a valid, Check 21 like image using PhotoShop or other graphics software programs which uses stolen DDA account data to create a fraudulent check. Also, given the lack of security in paper IRDs, banks are reluctant to accept random IRDs for deposit, slowing down their acceptance as returned items. Finally, banks do not believe that end users or customers are permitted under the existing Check 21 act so from the industry viewpoint, there are legal and regulatory barriers that must be overcome before Check 21 items would be viable consumer payment mechanisms. These problems must be overcome before the concepts of Check 21 can be applied to everyone—allowing more users to receive the benefits that are already being received by the banks. The benefits of image processing include faster delivery, lower costs from efficiently processing payments and the reduced clearing time and reduced risk exposure from unknown payor items on out of town banks. Finally, if properly implemented, the concepts provide by the Check 21 act would enable everyone from consumers to businesses to governments to charities to create and effectively process, secure electronic payments in a manner similar to existing low cost electronic payment methods such as ACH items covered under the National Clearinghouse Association (NACHA) rules.

Referring to FIG. 1, conventionally under Check 21, substitute checks or IRDs are only utilized between banks, such as clearing banks, banks of first deposit, and the like. A flowchart 10 illustrates an exemplary embodiment of Check 21 under conventional operation. First, a payor drafts a paper check from their demand deposit account (DDA) bank (step 12). Next, the paper check is physically delivered, such as mailed, hand delivered, etc., to a payee (step 14). The payee manually deposits the paper check into their bank account (step 16). The bank where the payee deposits the check is referred to as a bank of first deposit (BOFD). Once in the BOFD, the paper check is sorted and converted into a substitute checking according to the regulations under Check 21 (step 18). The BOFD can pay the payee cash, credit the payee's account, or the like (step 20) once the check has been deposited into the payee's account. Also, the BOFD initiates the clearing process with the substitute check through a clearinghouse or the like (step 22). The clearing process moves the substitute check to a clearing bank, i.e. the bank with the DDA account of the payor, and the clearing bank validates the substitute check, verifies the account exists with sufficient funds, and finally pays the BOFD (step 24). Finally, the clearing bank can use the substitute check image with the payor's monthly statement in lieu of paper checks (step 26).

Of note, the Check 21 Act does not require any bank to use electronic check processing, receive electronic presentment, or create substitute checks based on check images. However, after the effective date of the Check 21 Act, any bank that requires an original check must accept a legally equivalent substitute check in satisfaction of that requirement. As a result, for the most part, banks would not be required to change their check processing equipment or practices because of the Check 21 Act, and there would be no need for a bank to sort original checks and substitute checks separately during the check collection process. Using the substitute check format, banks which choose to use image processing during their check collection and clearing process are allowed to do so while maintaining backwards compatibility with banks which do not have the ability to electronically process image files. For example, in the past a depositary bank in California that receives a check drawn on a bank in New York would transport the original paper check back to New York for payment. Now under Check 21, a substitute check image file can be sent to the New York bank without specific prior contractual agreement or consent by the New York bank to the California bank. Now, if needed, the New York bank (or its agent) can receive the image file and print it in IRD or substitute format and continue to process the re-created paper check using their traditional check clearing process. In summary, Check 21 allows banks that wish to image checks and exchange image files to do so while still allowing some banks to receive paper compatible checks based on these image files.

Electronic payments and images and the like contain raw data which constitutes the item itself, however there is another form of data called "metadata". Metadata is data about data. An item of metadata may describe an individual datum, or content item, or a collection of data including multiple content items. Metadata is used to facilitate the understanding, use and management of data. The metadata required for effective data management varies with the type of data and context of use. The concept of "generating a bitmap from metadata" is foreign to banks, but common in the computer graphics industry. Thus, those skilled in the art of payments generally do not know how the computer graphics bitmap "rasterization" process works. However, as is known by those skilled in computer graphics, it is often easier and more convenient to generate bitmap images dynamically from metadata. Further, there is no nexus between metadata driven bitmap generation and the payment system, checks, or legal contracts, the UCC and the like. Also it is considered by the present invention, in order to make an electronic check image payment system acceptable to banks, additional security is required to protect banks from accepting fraudulent images (e.g., created by hackers using a graphics program). Given the size and degree of investment that banks have made in paper check imaging equipment, it can be seen by those of average skill that there has been no incentive for banks to pay for the designing and building of new software systems to enable end user created paperless Check 21 items. Additionally, there is little to no existing Public Key Infrastructure (PKI) systems at banks (other than Secure Sockets Layer (SSL) keys for website security) to facilitate end user digital signing of Check 21 images.

Thus, conventional mechanisms in the banking and payment industry include imaging of paper checks. Check 21 law only allows banks to truncate paper checks to create Check 21 items. Remote (electronic) deposit is currently available where scanned paper checks are used, but cleared through an Automated Clearing House (ACH). There exists no conventional mechanism to allow electronic checks to flow through the entire check payment system without reduction to paper at some point. Existing "electronic check" prior art does not solve these problems as these all disclose a paper check in one form or another in the process. Further, these paper checks do not comply with ANSI X9 standards.

Additionally, the checking system provides advantages over other payment rails, such as lower transaction costs, advantageous legal protections to payors, and the like. Thus, it would be advantageous to utilize the electronic capabilities associated with Check 21 to form an Electronic Payment System operable under the checking system.

BRIEF SUMMARY OF THE INVENTION

In various exemplary embodiments, the present invention provides enhanced processing of Check 21 items using a digitally originated check (DOC) processed through an electronic payment system (EPS) which captures payor metadata instructions regarding the intended payment to a payee. The metadata is stored in a database or the like for further processing instead of printing a paper check. Advantageously, the EPS provides an E-commerce payment system utilizing the checking system with electronic Check 21 items. Of note, the present invention allows any payor to create a paperless Check 21 item utilizing methods provided by the EPS and DOC. Thus, this system provides an anyone-to-anyone or peer to peer (P2P) electronic payment system suitable for use by various Electronic Payments Clearinghouses (EPCH).

In an exemplary embodiment of the present invention, an electronic payment system includes a data store configured to store a digital payment file, a network interface configured to communicate to a plurality of users, and one or more processors connected to the data store and the network interface. The one or more processors are configured to: create a digitally originated check, store the digitally originated check in the data store, notify a payee associated with the created digitally originated check, track the digitally originated check, and process the digitally originated check; wherein the digitally originated check is stored as metadata in the digital payment file, and wherein the digitally originated check is created without an original paper check, and wherein the metadata includes the payment instruction, a globally unique identifier, tracking information, and security information, and wherein an output from the metadata in the digital payment file is interoperable with both paper and electronic clearing methods associated with Check 21 clearing systems.

In another exemplary embodiment of the present invention, an electronic payment method includes providing access to an electronic payment system, receiving data associated with a payment from a payor to a payee, creating a digitally originated check responsive to the data, wherein the data includes payment instructions, wherein the digitally originated check is stored as metadata in a digital payment file, and wherein the digitally originated check is created without an original paper check, and wherein the metadata includes the payment instructions, a globally unique identifier, tracking information, and security information, notifying the payee of the digitally originated check, tracking the digitally originated check, processing the digitally originated check responsive to the payor, wherein an output from the metadata is interoperable with both paper and electronic clearing methods associated with Check 21 clearing systems.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
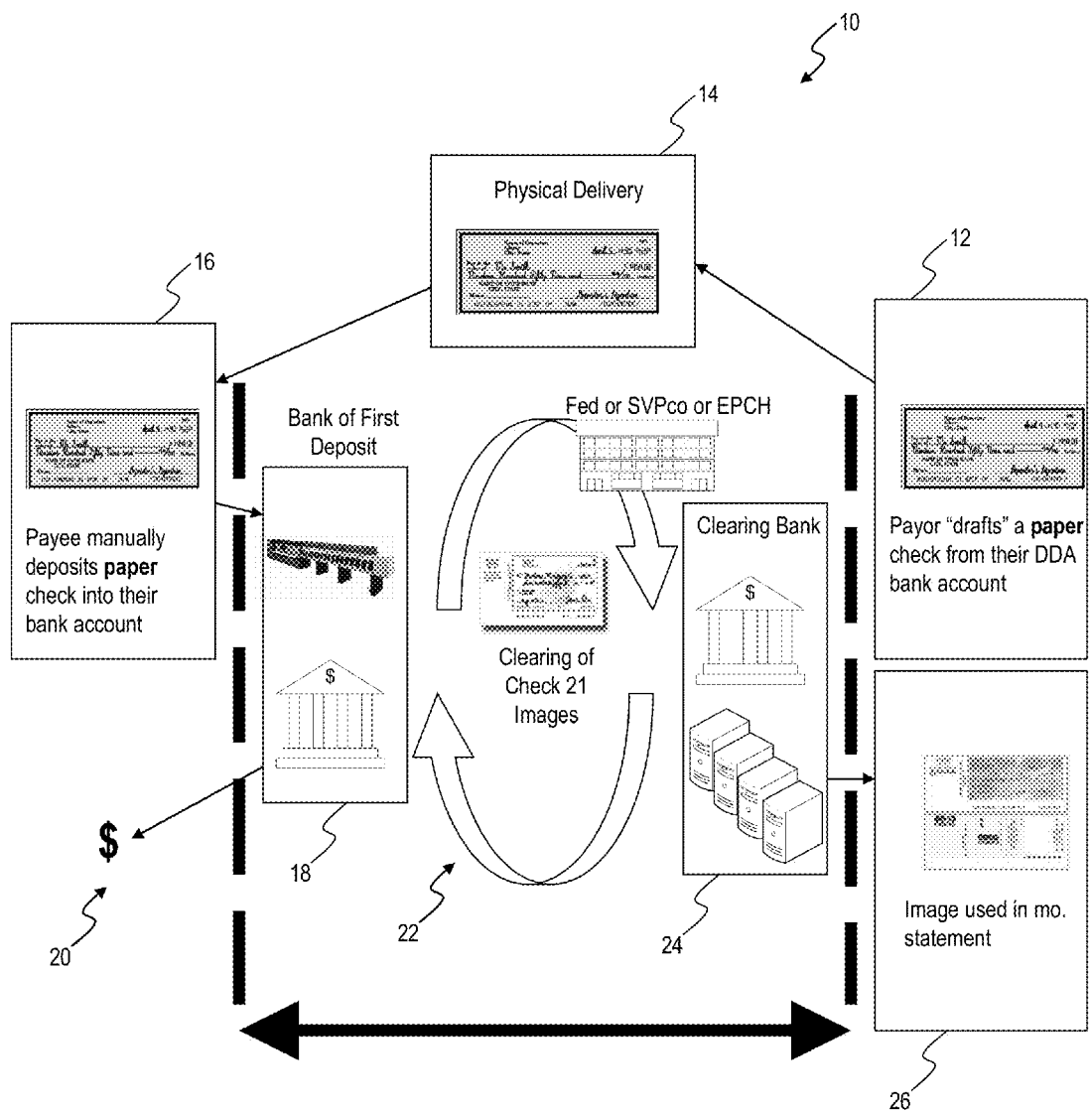
FIG. 1 is a flowchart illustrating the flow of checks and substitute checks conventionally under Check 21.

In various exemplary embodiments of the present invention, systems and methods are provided for an Electronic Payments Clearinghouse (EPCH) which operates as an electronic payment system under Check 21 to enable payors and payees to exchange legal payments. The EPCH is an online service which allows users/customers to deposit digitally originated checks (DOCs) into any bank, such as through a scanned paper check (i.e., an Image Replacement Document (IRD)) and as an electronic file (i.e., an Image and Cash Letter file). The present invention allows for the electronic creation and management of cash letter files compliant to ANSI X9.180 or the printing of IRDs compliant to ANSI X9.140 for all types of banks to facilitate customer (and bank) acceptance of DOCs and provide faster clearing in either case.

Advantageously, the EPCH understands the complete DOC record (i.e., security, audit, controls, etc.) so the system can update the DOC record with real time transaction status for everyone involved (i.e., payor, payee, BOFD, clearing bank, Fed, etc.). This feature provides small banks with big bank like features, and the service can be provided as a co-op that banks join to provide a neutral playing field for DOC exchange (e.g., the EPCH as a private clearinghouse competing with Federal Reserve (Fed) clearing but adding value via the ability to update DOC digital payment file (DPF) records). This feature can also solve the cross-bank security problem where two different banks use two different X.509 PKI security schemes, thus they cannot "read" each others encrypted DOCs, but they could if the BOFD sent the DOC file to the clearing bank using the EPCH as the middle man via pointing to a Transaction ID. A middle man like EPCH can participate (federate) both security models (or share a common model) in a neutral but secure fashion and facilitate (translate) the security models between banks. Thus faster and better clearing of DOCs can happen outside of a pure Check 21 image file exchange clearing method.

The present invention provides a mechanism to generate and process ACH items and other payment forms and the like, along with digitally originated Check 21 items. These items can be described as digitally originated checks (DOC) processed using the electronic payment system (EPS) which captures payor "metadata" which are instructions regarding the intended payment from a payor to a payee. The metadata is stored in a database or the like for further processing instead of printing a paper check. The type of data captured can include traditional information stored on the front of a paper check, such as instructions for "whom to pay" (payee name, phone number or email address), some value amount (input as a decimal number of some currency), the payment issue date, the bank account number from which the payment is to be drafted (traditional checking account number and ABA bank routing number), along with some potential set of conditions, limitations, or restrictions, along with memo field description details, and potentially some type of conditional acknowledgements which are defined to be business rules governing how and when the payment should be made (i.e., putting a contract on the back of a check, thus cashing the check is endorsing the contract).

These payment instructions or "metadata" can be captured or generated in a variety of ways or methods implemented by the electronic payment system (i.e. an EPS can have multiple input forms). For example, a human user can use a variety of system interface choices including an Internet webpage to input the required metadata to generate the DOC payment. Alternatively, a telephony device (cell phone, land line, via an IVR call center system, etc.) or an Internet browsing enabled mobile device (PDA) could be used to login and generate the payment. Additionally, the metadata could be generated by a user using a home or office PC software application such as Intuit's Quicken, Microsoft Money, or other accounting software programs. Also, the present invention contemplates the option of having no human user intervention by supporting generation of DOCs via an automated software program. This software program could generate pre-scheduled DOC payments with information stored in a payment database to send the resulting DOC files directly into the banking system for payroll or automated accounts payable type business scenarios.

In order to provide digitally originated Check 21 items, the present invention utilizes several elements. First, a framework of knowledge and understanding of the Check 21 law and Check 21 standards, such as X9.37, 140 and 180, which are herein incorporated by reference in-full, are utilized to enable paperless Check 21 items. Additionally, knowledge and understanding of the payments industry including Item Processing, UCC law, Electronic Funds Transfer (EFT) law, and how the "gaps" between Check 21, UCC, and EFT law are filled. Of note, the present invention utilizes a contractual relationship between a payee and payor to extend Check 21 warranties throughout the system for DOCs. These warranties enable electronic presentment from payees and payors despite the conventional belief that paper checks are required. §3-501(b) (2) and §4-110 of the Uniform Commercial Code (U.C.C.) specifically authorize banks and other persons to agree to alternative means of presentment, such as electronic image presentment. The present invention leverages these concepts to provide a UCC compliant, secure, and Check 21 compliant item in the form of the DOC.

Additionally, the present invention utilizes knowledge and deep understanding of how bitmaps are generated in applications such as GUI operating systems, fonts and graphics drivers for video cards, how websites and webservices work, how to capture data and store and manage that data as file input into other business processes (ex. payment clearinghouses). Further, the present invention includes knowledge and understanding of security concepts: PKI and Certificate Authorities (CAs), cryptography, steganography, SSL, digital signatures using public and private keys, secure hashes and the like. The present invention leverages knowledge and understanding of the weakness of images produced by existing bank Item Processing check sorting machines, including skew, Image Quality Assessment (IQA) and Optical Character Recognition (OCR) errors. Also, the present invention includes knowledge and experience with software design and architectures, Application Programming Interfaces (APIs), programming languages, character set encoding (ex. ASCII vs. EBCDIC) in electronic file formats, Unicode, internationalization techniques, and database design including SQL language and the like.

Advantageously, the present invention allows payors and payees to utilize paperless Check 21 items, i.e. DOCs, through the EPS without ever reducing it to a paper medium and therefore is applicable to E-commerce for payment. This allows the use of the Check payment system in place of debit cards, ACH transfers, credit cards, and the like. Further, the present invention offers payors the advantages associated with the checking system. The present invention includes mechanisms to enable substitute checks or electronic metadata files to be utilized by payors and payees without requiring paper checks. The key enablers to open the check payment system to paperless items include a contractual framework between payor and payee authorizing the DOC to comply with indemnities and warranties associated with paper checks, security involving PKI for secure digital payments, and computer graphics development to fully comply with all ANSI X9 standards to ensure full compatibility with Check 21. The present invention contemplates using the EPS features and mechanisms described herein to generate or clear payments utilizing other payment rails in addition to the checking system. For example, the features and mechanisms could be applied to ACH, to wire transfers, ATM, credit cards, debit cards, etc.

Figure 2:
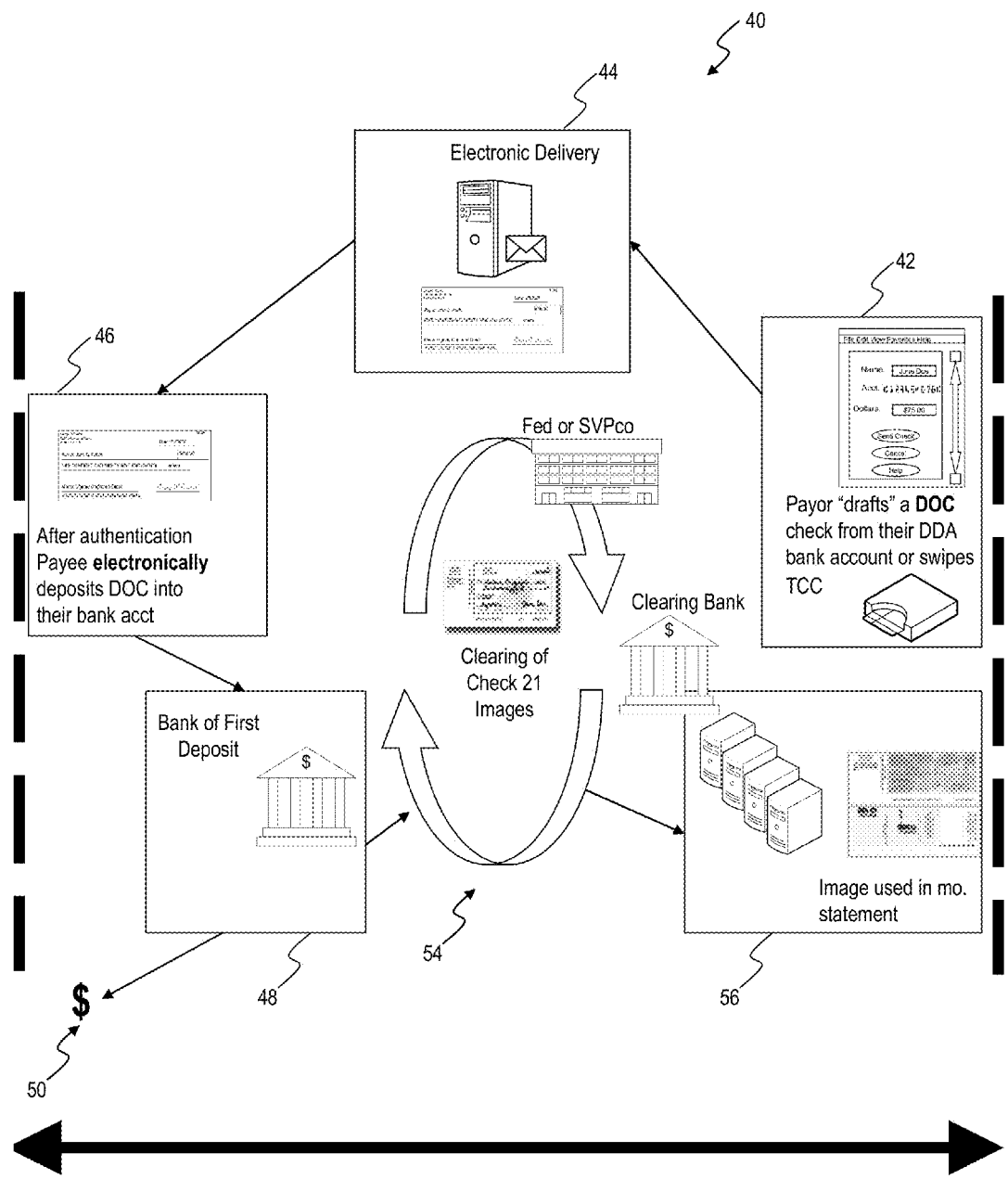
FIG. 2 is a flowchart illustrating the flow of checks, substitute checks, true check card payments, and the like, according to an exemplary embodiment of the present invention.

Referring to FIG. 2, in an exemplary embodiment of the present invention, a DOC is processed electronically throughout a banking or EPCH clearing system 40. First, a payor 'drafts' a DOC check from their DDA bank account or swipes a true check card (step 42). The DOC is created through an EPS, and the DOC is a valid UCC draft in electronic form under the Check 21X9 standards. The DOC is created with user initiated instructions to pay someone (i.e. a payee), some value amount, under a set of conditions, limitations, restrictions, acknowledgements, and the like. These instructions are stored in a database—e.g. a Digital Payment File (DPF). These digital instructions are used to create a digital check, and there is no paper check required to create these instructions and there is no paper origination or scanning. Additionally, the DOC can be created by "swiping" a true check card (TCC) which electronically generates the DOC at a point-of-sale (POS) terminal.

Delivery of the DOC to the payee is electronic (step 44), and the payee is notified. This notification mechanism can take a variety of forms of messaging from the EPS such as an email message (e.g., with an embedded URL with transaction ID to automate the retrieval of the DOC, an embedded file, and the like), a phone call, a pager message, a fax message, an Instant Message (IM), or the like. Once the payee has responded to the EPS notification message, the payee uses a unique transaction identification known as a Globally Unique Identifier (GUID) which was provided to them in the notification message to identify which specific DOC to retrieve. The GUID is a special type of identifier used in software applications in order to provide a reference number which is unique in the context for which it is used, for example, in defining the internal reference for a type of access point in a software application, or for creating unique keys in a database. In the present invention, the GUID is sufficiently large to avoid object collisions, i.e. duplicate numbers, and it utilizes an algorithm to ensure GUIDs cannot be spoofed.

The EPS can use the GUID to lookup the DOC transaction and determine how to authenticate the payee based on the authentication level chosen by the payor when sending the DOC (or setup by the payee as a condition for retrieving payments from the EPS under a specific name or ID). Authentication levels can include, none (i.e., just knowing the transaction ID or GUID is enough security for the payor), a unique PIN number for each DOC (e.g., PIN is sent separately by the payor, i.e. a phone call, or if sent via the EPS it is sent separately from the notification message), additional levels of credentials (e.g., unique account number and login ID into the EPS), private digital security signature key (e.g., using a public key cryptography system), or other level of security mechanism agreed to by one or both parties and supported by the EPS.

The GUID can additionally be used to protect payor personal information. Here, the EPS web service keeps the originating customer's personal information away from the service provider they subscribe with (Web.com website or some other merchant). The customer creates an account code (i.e. a GUID) that identifies how to bill them, the customer gives the GUID to the service/merchant and says "bill this account" via a DOC or creating an ACH debit item or other payment form and the like. The merchant does not know the customers real checking account data—they tell the EPS webservice or API to "bill this GUID" X dollars, the intermediary web server does have the personal data, and the billing is automated via creation of the real DOC or ACH message through the guid webservice translation service. This EPS method does the work of an "ACH Credit Push" type service for banks, merchants, or service providers who don't know how to do originate ACH or other payment form items.

After satisfying the authentication and security tests, the payee electronically retrieves a Check 21 image of the payment and verifies that the payment information is correct. After retrieval of an image and verification, the payee can choose the method of depositing the DOC into her bank account (step 46). The present invention provides the payee with multiple choices for depositing or clearing the payment. For example, the payee can retrieve a DPF record for the specific DOC (using the GUID), and the EPS can generate a DOC image (in Check 21 image format) and display it allowing the payee to confirm payment, verify the payment amount, review business conditions or payment constraints (TTL etc), and the like After reviewing the DOC, such as through the EPS, the payee has a choice in how to proceed with claiming their payment. First, the payee can choose to physically print the DOC as an IRD onto paper using a printer, and physically depositing it at the bank like a traditional paper check, i.e. using X9.140 clearing methods. Further, the payee can have the EPS forward the DOC electronically into their bank as an Image Cash Letter (ICL) exchange for deposit saving the time and effort of a trip to the bank, i.e. using X9.180 clearing methods. For example, the forward deposit can use email to send the ICL to a known bank address, such as deposits bankxyz.com, where the bank's computer system, utilizing either an EPS supplied hardware appliance device or the EPS webservice or API, can automatically remove the attached ICL file in order to process and credit the deposited item. Also, alternatively, the EPS and or hardware appliance can convert the DOC into another form of payment, such as Automatic Clearing House (ACH) and the like.

The BOFD (step 48) provides the payee credit for the DOC (step 50) and clears the DOC through the normal clearinghouse process (step 54). As the DOC payment is processed or "cleared" by the banking system 40, the individual DOC file can subsequently be placed into a standard bank clearinghouse Cash Letter File (X9.180 standard) "bundle" along with other check items (i.e., digitally created or paper scanned images) and exchanged electronically with other banks. Currently, most of the traditional clearinghouse or electronic image exchange mechanisms support Check 21 image file exchanges including the Federal Reserve System, View-Pointe, SVPco/The New York Clearinghouse and the like. Additionally, X9 type image files are used as the "accepted format" in many private two party (bank to bank) image exchange agreements. For example, banks, such as Wachovia and Bank of America, can exchange image files directly with each other under private clearing agreements in the X9.37 format. Finally, the DOC clears through the clearing bank, the clearing bank transfers the funds to the BOFD, and the clearing bank uses the DOC image in the payor's monthly statement (step 56).

Figure 3:
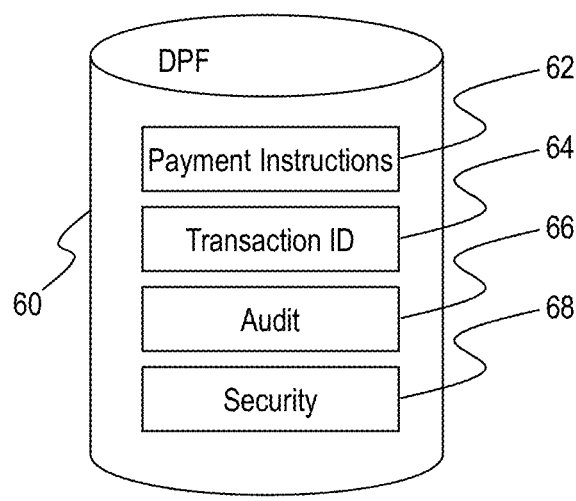
FIG. 3 is a block diagram of a digital payment file (DPF) according to an exemplary embodiment of the present invention.

Referring to FIG. 3, a digital payment file (DPF) 60 includes payment instructions 62, a transaction identifier 64, audit information 66, and security information 68, according to an exemplary embodiment of the present invention. The DPF 60 represents a digital payment from a payor to a payee of a Check 21 item. The DPF 60 contains metadata representing a digitally originated check (DOC). The DPF 60 is created, stored, and distributed electronically, such as through an electronic payment system (EPS). For example, an EPS can include a data store, processor, and network interface all configured to interact with users, businesses, banks or clearinghouses for creation, distribution, and processing of the DPF 60. The DPF 60 is utilized to provide an electronic check payment that can clear via Check 21 paper or electronic clearing mechanisms.

The payment instructions 62 can include instructions for "whom to pay" (payee name, phone number, email address, or the like), some value amount (input as a decimal number of some currency), the payment issue date, the bank account number from which the payment is to be drafted (traditional checking account number and American Bankers Association (ABA) bank routing number), along with some potential set of conditions, limitations, or restrictions, along with memo field description details, and potentially some type of conditional acknowledgements which are defined to be business rules governing how and when the payment should be made (i.e., putting a contract on the back of a check, thus cashing the check is endorsing the contract).

The transaction identifier 64 is a globally unique identifier (GUID) which is a unique transaction identification used to identify the specific DPF 60 record. The GUID is a special type of identifier used in software applications in order to provide a reference number which is unique in the context for which it is used, for example, in defining the internal reference for a type of access point in a software application, or for creating unique keys in a database. In the present invention, the GUID is sufficiently large to avoid object collisions, i.e. duplicate numbers, and it utilizes an algorithm to ensure GUIDs cannot be easily spoofed.

The audit information 66 includes the history for an audit trail of the DPF 60 through the EPS. Since the DPF 60 is an electronic item, it can be tracked real-time. The audit information 66 can include timestamps and associated actions, such as creation, notification of payor, payor actions associated with the DPF 60, and the like. For example, the EPS can be configured to track, i.e. record and monitor, all interaction with the DPF 60.

The security information 68 includes mechanisms designed to protect the DPF 60 from fraud, counterfeiting, and tampering. The security information 68 can include Public/Private Key Infrastructure (PKI) and Certificate Authority (CAs), cryptography, steganography, Secure Socket Link (SSL), digital signatures using public and private keys, secure hashes and the like. Additionally, the security information 68 can include payee and/or payor authentication requirements, such as a unique Personal Identification Number (PIN) for each DPF 60, additional levels of credentials (e.g., unique account number and login ID into the EPS), private digital security signature key (e.g., using a public key cryptography system), and the like.

The security information 68 can further include digital security features, such as digital watermarks, steganography, and cryptographic features that can be applied to the "bitmap" sent out to DOC recipients. These features apply when the DPF is converted to a paper item, such as a substitute check, or an electronic representation of a paper item (e.g., an email with an image of the substitute check). These features can be used to validate that the check was not altered. Some Digital Rights Management (DRM) features could even be "Image Survivable" meaning that they exist after an IRD printing and subsequent scanning back into an image (e.g., barcodes).

The security information 68 provided by the EPS can also enable new business services and encourage electronic depositing of DOCs (versus IRD printing) because a DOC can have a very short life (versus traditional paper checks having a default "good for 180 days" longer life). For example, the security information 68 can include an EPS settable time-to-live (TTL) metadata value. Here, electronic deposit, such as through the EPS, is preferable in the case of a short TTL. This feature is also useful to a payor to ensure that the check is accepted by the payee right away. This allows the payor to confirm that a payee accepted their offer when it was made with a short lived (e.g., one hour) check. It allows the payor to confirm that they did indeed make a purchase (i.e., when an item is offered for sale at an E-commerce auction site and their are multiple parties bidding the user would tell the EPS to put a short TTL value on their offer using a DOC to ensure that the "first valid offer in" was accepted). This allows the first bidder with the money to be selected because the payee (i.e., seller) knows that if they wait too long to see what else may come in they could lose the first DOC offer they receive.

In an exemplary embodiment of the present invention, the DPF 60 represents metadata associated with a digitally originated check (DOC) which is compliant to existing Check 21 paper and electronic clearing methods. These check clearing methods can include a substitute check or Image Replacement Document (IRD) compliant to ANSI X9.37 draft as well as X9.140 IRD final standard, or an Image and Cash Letter Format file compliant to X9.180 standards. The check is referred to as a DOC due to the computer generation of the DPF 60 to distinguish it from the traditional scanning of a paper check which could be called manual or "paper origination" of a check image.

Figure 4:
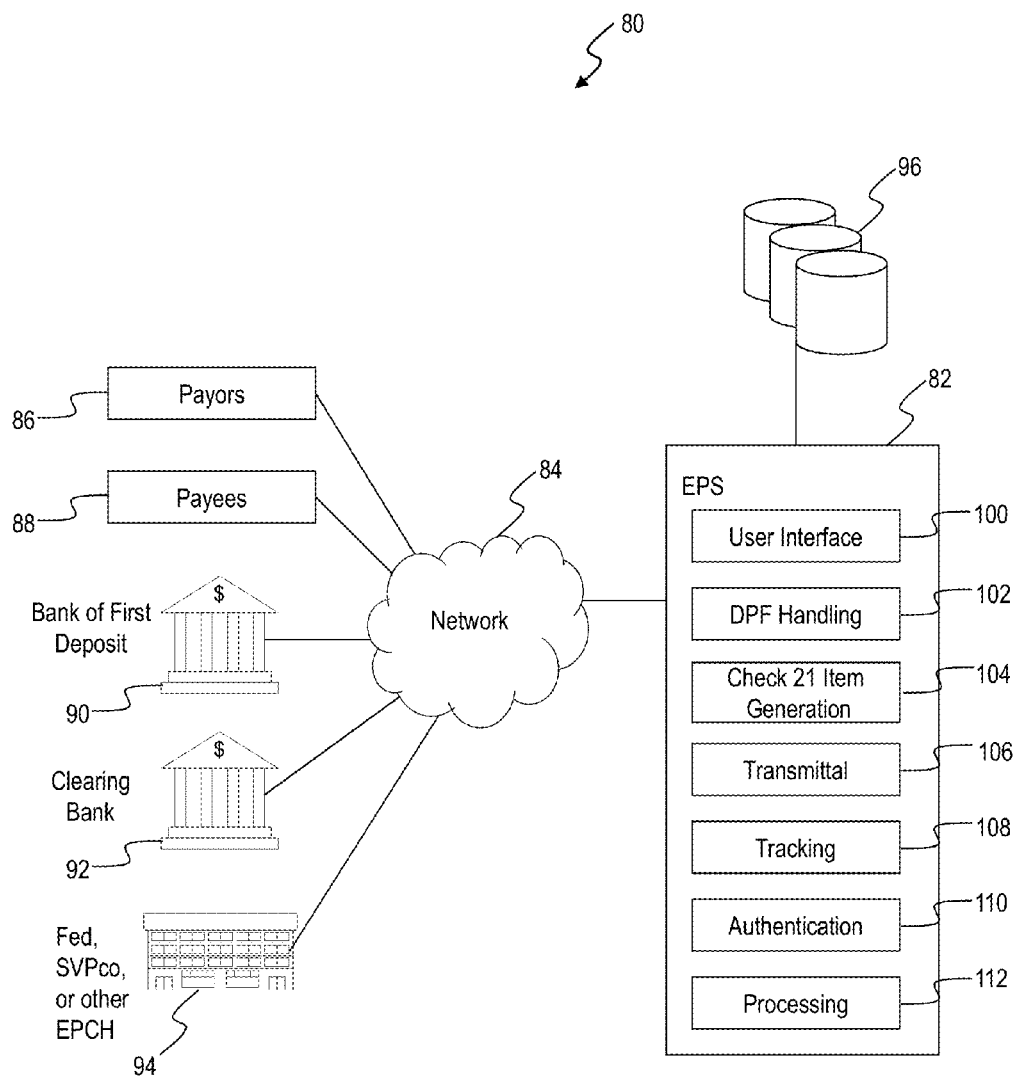
FIG. 4 is a block diagram of an EPS system according to an exemplary embodiment of the present invention.

Referring to FIG. 4, an EPS system 80 is illustrated according to an exemplary embodiment of the present invention. As described herein, an EPS 82 is an electronic system configured to interact with a plurality of users (i.e. payors and payees), banks, and other financial institution to enable DPF generation, distribution, tracking, authentication, security, clearing, and the like. The EPS 82 is configured to communicate over a network 84 to a plurality of payors 86, payees 88, BOFDs 90, clearing banks 92, clearinghouses 94, and the like.

Generally, the EPS 82 is a computer system which can include multiple processing elements, distributed memory, network interfaces, external data storage 96, and the like. The EPS 82 is configured with processing and data storage redundancy, and is configured to communicate to the plurality of payors 86, payees 88, BOFDs 90, clearing banks 92, clearinghouses 94, and the like. The EPS 82 includes various modules, such as a User Interface (UI) 100, DPF handling 102, Check 21 item generation 104, transmittal module 106, tracking module 108, authentication module 110, and processing module 112. The UI 100 provides a mechanism for users 86, 88, 90, 92, 94 to create, verify, distribute and process DPF files. Further, the UI 100 can provide mechanisms for tracking, modification, clearing, processing, security, authentication, depositing, reissuing, and the like with regards to DPFs. Also, the EPS 82 can include mechanisms for automating these processes without the need for direct UI 100 access, such as with automated processing.

The DPF handling 102 module is configured to create, modify, update, etc. of DPF files associated with specific checks. As described herein, the DPF is a database record storing the metadata instructions related to a check. The EPS 82 is configured to store multiple DPFs in the data storage 96 or the like, and to enable the plurality of payees 84, payors 86, BOFDs 88, clearing banks 90, and clearinghouses 92 to create, transmit, receive, and process the DPFs. The DPF handling 102 module is configured to create metadata responsive to user input, through scanned check OCR, through various payment truncation methods or through automated processing. Also, the DPF handling 102 module manages tracking features, audit features, and the like described further herein.

The Check 21 item generation 104 module is configured to create Check 21 images with enhanced quality such that they pass various bank image quality tests such as the stringent Federal Reserve "Image Quality Assessment" (IQA) tests (see e.g., www.frbservices.org/Retail/check21TechInfo.html "Black and White Image Standard and Quality Checks" document incorporated fully by reference herein) or the X9 guidelines (see e.g., TR-33-2006 Check Image Quality Assurance Standards and Processes document incorporated fully by reference herein). The IQA procedures are a series of tests that are performed on a Check 21 image file before they will accepted and processed by the Federal Reserve clearing network. The Fed IQA tests are also utilized by a variety of banks as their own internal set of Check 21 images tests, thus ensuring image file interoperability between any two banks. While the DPF can be transmitted electronically as an X9.180 cash letter file, it can also be used to generate the X9.140 standard "substitute check" or IRD which results in a paper version of the original digital check. The IRD can be printed by the payee and taken into their bank for deposit because it contains a full set of warranties and indemnities. These full set of warranties and indemnities are based on a contract agreed to by both the payor and the payee which the EPS 82 required to be signed in order for the DPF to sent or received. Because DPFs are covered under this contract, they have a full set warranties and indemnities that are acceptable to BOFDs 90 and downstream clearing banks. This novel DPF feature, possessing a "full warranty" state, differs from other attempts by either businesses or individual consumer users who want to print their own IRD documents and deposit them at a bank because those documents will not be accepted by the BOFD 90 due to the depositing bank's inability to take on un-transferable risk from an unknown originator of the IRD. This scenario is contemplated where an individual or business does not have an existing two-party private warranty contract with their bank which is a concept allowed for under existing UCC law. Also, under the Check 21 regulation as it exists today only banks can truncate checks by imaging them and later extend their warranties to subsequent clearing banks in either electronic or IRD form.

The transmittal module 106 is configured to handle transmission of DPFs between the various payors 86, payees 88, BOFDs 90, clearing banks 92, and clearinghouses 94. As described herein, each DPF includes a GUID as a unique transaction ID. With the present invention, a bank teller could input into the EPS 66 through the UI 100 (e.g., a webpage, webservice, API or phone IVR system) the digits from the unique transaction identifier (GUID) which can be found on the IRD. This GUID input system is linked to the EPS 82 that originally generated the DPF, and which allowed the payee to print the IRD in the first place. The GUID value can be printed and found on the front of the IRD in the Check 21 "optional data field" location where it was placed during the IRD generation process by the Check 21 item generation module 104.

Using the transmittal module 106, a unique business service provided by the EPS allows the bank teller at the BOFD 90 to request that the specific Check 21 item be re-generated as an electronic image file and be sent back into the BOFD 90 for further processing by their "Item Processing" department. To accomplish this regeneration, the EPS 82 can use the teller supplied GUID value to lookup and retrieve the specific metadata information that was stored in the DPF system. As these re-creation requests arrive at the DPF, the original metadata values (or the currently stored values) are retrieved from the EPS 82 and used to re-create the digital check file in X9 format for further image exchange processing. This electronic X9 file can then be sent or routed directly back to the BOFD 90 via a secure electronic link such a Virtual Private Network (VPN) connection, a private clearinghouse (EPCH) secure connection or via the existing Federal Reserve System using the standard Cash Letter File format. The ability to re-generate at will (or at any future time) a fully compatible Check 21 digital image without scanning or handling a paper IRD is a further unique element of the present invention. The benefits of this feature are derived from the fact that the auto "regeneration" process using DPF stored metadata avoids the errors of paper scanning and is a great benefit to banks in reducing the amount of labor involved in handling of paper items. Thus, there is no need to scan an IRD submitted for deposit in order to generate the front and back check image in standard Check 21 format. The regenerated image and data values can be generated directly from the EPS 82 and sent back to the BOFD 90 in a standard Cash Letter File for further image exchange processing.

The tracking module 108 is configured to provide real-time and historical tracking of each DPF created and processed through the EPS 82. The present invention allows the DPF to be generated through the EPS 82 anytime with a full history and audit trail. This is because the DPF is electronic and all interaction with the EPS 82 can be recorded, monitored, and tracked through the tracking module 108. Additionally, the DPF can still be processed locally on paper as an IRD, or it can be recreated and sent into a bank electronically at will. All of these concepts are based on the idea that the DOC is built around the metadata "instructions to pay" stored in the DPF, and the tracking module 108 can track the various steps by recording data in the DPF. The tracking module 108 provides similar information as a shipment tracking feature, such as with UPS or FedEx. The DOC issuer can view real-time status related to the DOC to determine when the payee is notified, when the DOC is retrieved (which can also tie to an auto-notification feature), and if the EPS is tied into the payors bank account or has a stored value account at the EPS when the DOC was cashed, if and when it is endorsed to a third party, and the like. Additionally, significant events related to the DOC can be pre-subscribed to auto notify when they occur. For example, the payor can be auto-notified when the DOC is cashed.

The tracking module 108 in conjunction with the processing module 112 can be utilized to provide a more efficient stop payment service. This feature permits the cancelling of a DOC check after issuance by the payor, but before depositing into the payees bank or clearing on the payors account. The EPS 82 can check for a cancellation notice before allowing any type of electronic deposit or IRD printing. This mechanism also affords the payee with an opportunity to instantly verify that the DOC check is still "good" for deposit before IRD printing or when making an electronic deposit request (i.e. they are not offered these options if the check has been canceled). If the DOC is cancelled after the payee makes their deposit (electronically or via IRD), the check experiences conventional NSF cancellation means, such as the check returned from the issuing bank as being "not collectable".

Also, the tracking module 108 can be utilized to provide a DOC guarantee service. Here, the DOC issuer (payor) or the receiver (payee) can decide (opt-in) to add this feature to the DOC. The payor can choose to pay for this when they issue the DOC or the payee can add it when they receive the check (before cashing/depositing). If the payor did not pre-certify, the EPS 82 can still offer the payee the certification feature using a verification-type service (the EPS can guarantee the check amount because they actually "buy" the check at a discount after they verify it using their PPD and check security and verification methods). Note, the EPS 82 already knows if the DOC is valid because the GUID can be checked in real time and verified, such as via PKI for authenticity and non-repudiation. The EPS 82 does not need to keep a list of bad accounts; it has a positive pay database to already know who issued the DOC and where to go if it is uncollectible due to a closed account.

The authentication module 110 is configured to provide security relative to creation and processing of the DPFs. For example, the EPS 82 uses the GUID to lookup the DPF transaction and determines how to authenticate the payee based on the authentication level chosen by the payor when creating the DPF (or setup by the payee as a condition for retrieving payments from the EPS 82 under a specific name or ID). Authentication levels can include nothing (i.e., just knowing the transaction ID or GUID is enough security for the payor), having a unique PIN number for each DOC, having additional levels of credentials (e.g., unique account number and login ID into the EPS 66), private digital security signature key (e.g., using a public key cryptography system), or other levels of security agreed to by one or both parties and supported by the EPS 82.

The processing module 112 is configured to allow payees 86, payors 88, BOFDs 90, clearing banks 92, and clearinghouses 94 to process and clear DOCs through the EPS 82. As described herein, DPFs are identified through the GUID or the like. Once identified, the processing module 112 enables forwarding or clearing of the DPF. For example, the processing module can generate the electronic image file and send it to the bank of first deposit for further processing by the "Item Processing" department. As these re-creation requests arrive at the processing module 112, the original metadata values (or the currently stored values) are retrieved from the system and used to re-create the digital check file in X9 format for further image exchange processing. This electronic X9 file can then be sent or routed directly back to the bank of first deposit via a secure electronic link such as the existing Federal Reserve System using the standard Cash Letter File format. The regenerated image and data values can be generated directly from the EPS 82 and sent back to the bank of first deposit in a standard Cash Letter File for further image exchange processing and clearing. Thus, this further demonstrates that any items produced by the invention are built using a fully Check 21 compliant process from electronic metadata (instructions to pay) stored in a database (DPF) instead of scanning paper or existing check image data.

In an exemplary embodiment of the present invention, the EPS 82 can be utilized to accelerate ACH-based payments. Conventionally, ACH flows require multiple steps over a 48 hour cycle to provide a payment between two parties. The EPS 82 can provide real-time clearing features instead of the traditional nightly "batch job" mechanisms used by banks today. By offering a modem internet "web service" mechanism through the EPS 82 to both ACH originators (businesses trying to get paid) and to banks, the present invention could process ACH requests very quickly or optionally in real-time. Thus, the present invention could theoretically save most of the wasted time from conventional ACH payments because the EPS 82 real-time mechanisms take minutes not days. By offering an incentive to the Receiving Depository Financial Institution (RDFI) to retrieve ACH requests on a minute-by-minute basis, conventional ACH payments could also be done in minutes not 1 day. The net result may be a completed ACH payment within minutes—this allows ACH to compete with credit cards, debit, and ATM in terms of speed (which it clearly does not do today). To start with, the EPS 82 could automate payment exchange between an existing billing cycles utilized by service business such as the monthly ASP/website business vendors and any ACH service provider. This web service interface accepts individual account details (or batches of account info) sent to the EPS 82 via a WSDL generated WebAPI, this allows ASP and web-hosting centric customers to easily automate their billing system with an ACH payment processor. The EPS builds the National Automated Clearing House Association (NACHA) formatted Automated Clearing House (ACH) file for each item received and intelligently batch them (if needed) before streaming them into the ACH network for settlement. This speeds up processing, eliminates the older/slower FTP file transfers due to batch jobs, and allows for streaming billing to occur all day. This service also improves cash flow for a web site operator, because they get their money faster, and it also jumps the ACH payment to an earlier in day cutoff window for a lower cost transaction (late night jobs cost more). Other enhancements include, automated Acknowledgement (ACK) to your billing system (if no ACH rejection notice was received), automated Rejection handling (with retries), reconciliation etc which traditionally ACH does not provides to ACH originators today.

In addition to utilizing the UI 100 of the EPS 82, payors 86 could also use a check card operable to create DOCs. For example, the check card could include the metadata on a magnetic strip, and create a DOC at a point-of-sale (POS) terminal by swiping the card at check out. Additionally, the EPS 82 can be configured to store credits on the payor's 86 account. For example, when purchasing an item using a DOC "Check Card," the DOC is issued to the merchant, but this transaction can be easily reversed if the customer returns the item to the store. Thus, by swiping a Check Card, the EPS 82 can instantly reverse the DOC (or cancel it, or issue store credit)—this is easier than putting a "stop payment" on the DOC or waiting for "credit" to your account. Alternatively, the Merchant can write a DOC back to your account instead of a crediting your account. The EPS 82 has a choice—automatically issue the stop payment on the DOC or issue an identical but reversed DOC (from merchant's account back to the customer's account).

The DOC "Check Card" can include a plurality of information transmission mechanisms including but not limited to one or two magnetic swipe strips, a Radio Frequency ID (RFID) chip, a smart card chip, a Bluetooth interface, or the like. The check card is configured to transfer the account information (i.e., metadata) into a POS device. The extra strips are required to add traditional ACH or Debit card swipe features to a DOC check card for backwards compatibility with older POS equipment that can not read the new Check Card/DOC format. Also, the present invention allows new POS terminals to be developed that support DOC generation via the new or alternative "contact" or contact-less methods. The magnetic stripe is only one way to generate the ISO message format data and check account data that is needed to generate a DOC at the point of purchase.

In another exemplary embodiment, the EPS 82 can be configured to generate a DOC from a credit card payment. This can create a cash advance by allowing a cardholder to convert a charge on their credit card into the DOC. Currently only credit cards issued by Visa and Master Card and the like can offer "cash advances," but with DOCs, the EPS 82 could allow other businesses to offer this. This mechanism permits the business to create a DOC on behalf of the Visa or Master Card holder, similar to a "cash advance" and then "cash the check" as payment fulfillment. The customer notifies the EPS 82 that they want to make a DOC from a credit card transaction source, the EPS 82 acts as the merchant acquirer, and switches the payment over to the DOC which they then treat as any other check, but the funds are provided by Visa or MasterCard and made payable to the DOC issued by the EPS 82.

Additionally, the EPS 82 can be configured to include a payment statistics database based on historical data of DOCs. Here, every DOC that is created can contribute to the database which collects payment statistics (like user demographics, payment amounts, rates of payments, etc) on individual users and their corresponding payment histories as well as on overall check market statistics. The individual user statistics can be used to generate a FICO-like (Fair, Isaac and Company) score for rating user risk for check clearing (i.e. do they bounce a lot of checks?). The overall check market statistics can be sold to academic researches such as the Federal Reserve payment studies as well as to other parties such as consulting services whishing to establish benchmarks, standards or minimum score targets for their customers. Example statistics tracked by the EPS 82 can include DOC clock time (average time to clear a DOC), length of time to deposit or cashing, average DOC amount, average number of payees, average DOC TTL, and the like. This tracking creates an opportunity to perform "Data Mining" on DOC payors and payees and sell this information into the market for those who want to know more about consumer or business behaviors. This also allows the EPS to issue a rating system, such as the quality of the payor. This presents the payee with a numerical value that expresses the "quality" of the payor as far as the EPS 82 knows about their history. This uses the audit trail and DOC history to calculate a numerical value that measures the creditworthiness of the payor (e.g., how well their checks clear, NSF rate, average clearing speed, etc.) This can be an issuer controlled feature (they could send out their rating or not), but the score always is kept/updated on the backend so the value is always there—the payor could optionally control whether the payee sees it or not.

The EPS 82 services can also include numerical calculators or accounting applications configured to convert payments into different currencies, such as for future DOC issuance. This is useful for payors 86 who make a lot of payments in a foreign currency. This application takes the payment amount, and reserves the current exchange rate for some short term, future use, when issuing a DOC using the TTL feature. This feature is different than existing currency exchange rate lookup services or nightly payment exchange services in that it would be based on a TTL clock set in the DOC record. The reservation of the future rate is recorded, and a contract is issued automatically into the EPS 82 DPF and stored in a DOC record to be fulfilled/used later at DOC creation time. If the DOC is not issued in time, the rate expires back to some pre-set default or the EPS could use the current rate whenever the DOC was finally authorized for sending. This allows business or check writers to hedge their currency bets against future currency conversion rates by allowing them to lock in a current rate now, but for use only with a near term future check payment made under a separate DOC authorization step. Thus the Treasury Management department services offered to a large corporation could pick the best rate of the day and "lock it in" for use on the accounting systems DOC based check run that day or night.

Figure 5:
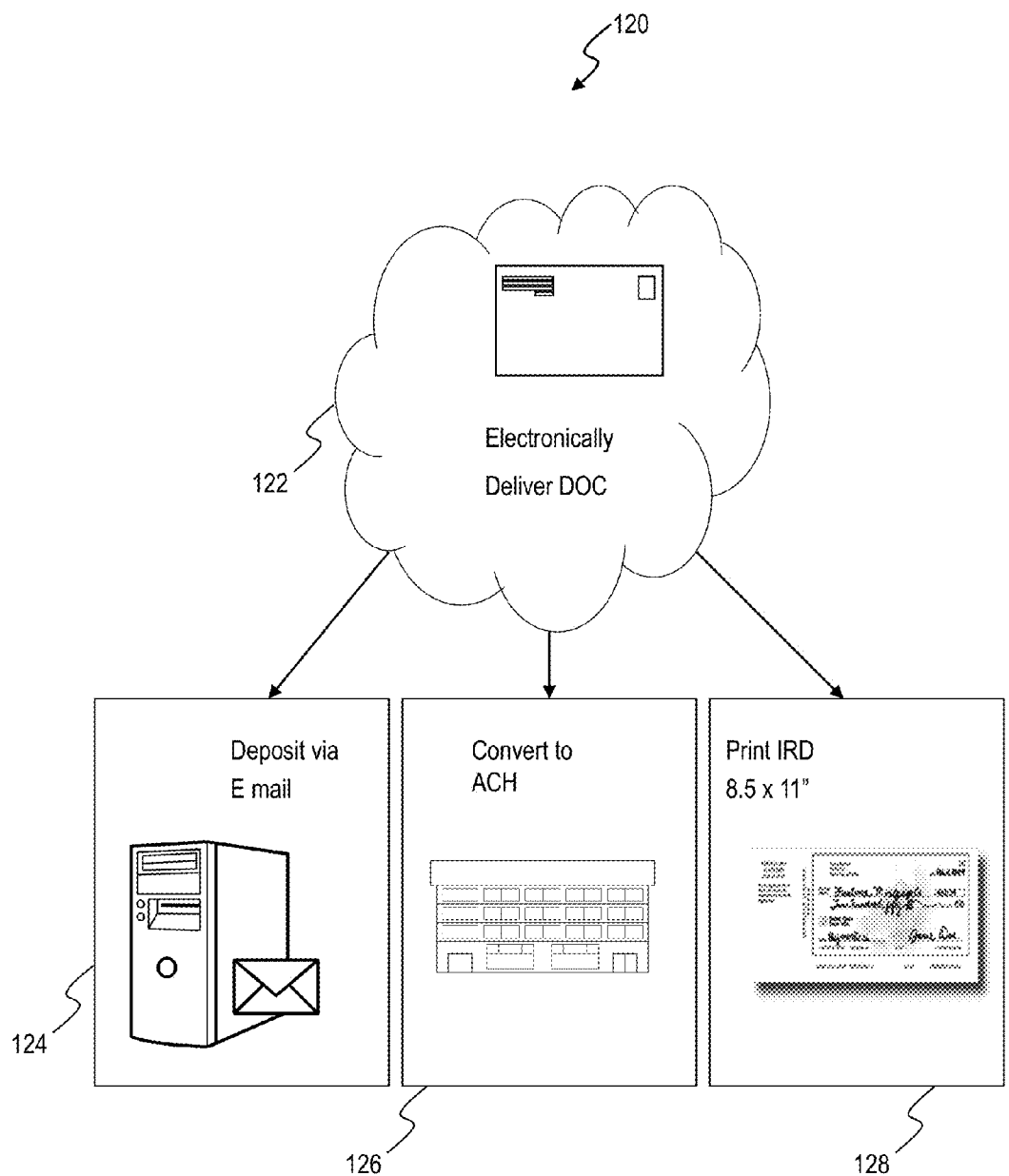
FIG. 5 is a flowchart of a DOC delivery system according to an exemplary embodiment of the present invention.

Referring to FIG. 5, various delivery mechanisms 120 are illustrated for DOCs utilizing the EPS, according to an exemplary embodiment of the present invention. First, a DOC is electronically delivered (step 122). The EPS can provide delivery of the DOC through any mechanism including email, fax, text message, instant message, phone call, page, and the like. After delivery, a payee can utilize several deposit mechanisms with the EPS.

When someone receives a DOC notification via email, the present invention can automatically know that it has a valid or good email address, i.e. the EPS can build a positive "white list" of good email addresses (vs. a negative black list—which is a list of known spammers). Using the EPS, the DOC metadata contains payee email address metadata which is used to create a list of known good email accounts—versus dead email accounts; this is true because if the EPS was able to successfully notify the payee that they have a check (via email) and the payee comes back into the EPS to pick it up, the EPS knows that it must have reached the payee via a good email address. Also, alternatively, the EPS could provide a validation or verification service to well known SPAM filter services operating in front of email servers. This means that a SPAM filter service could ask the EPS to verify an email address from the EPS "white list" and decide to either let in an email message or not. Thus, the EPS can rely on the fact that recipients of DOCs via email automatically create a "white list" of known good emails for anti-SPAM services. The concept of providing a valid value transfer notification method (the email notification) allows additional services to be built which extend outside of the traditional payment services offered by the EPS.

The EPS can offer additional services to the payor and payee such as providing the concept that delivery of the DOC can be automatic, e.g. an auto-escrow confirmation service via a shipping notification method. This is an automated mechanism to trigger payment of shipped goods when an electronic shipment tracking notification is published to or consumed by the EPS. This feature ties the "conditional payment control" features of DOCs to the existing shipping or delivery supply chain channels as one of the many workflow steps that can trigger a DOC to be issued/released/paid, etc. For example, when a person signs for receipt of package delivery such as UPS or FedEx and the like, the delivery service can send a signal to the EPS to automatically generate a DOC to pay the shipper or the delivery service. Thus, confirmation of delivery means that a payment should be issued to someone as a condition of escrow fulfillment.

Further, the EPS can provide a COD (check on delivery) using DOCs tied to a shipping system. Payment on delivery is made when a user signs for their package with the shipper, the computer inside the UPS or FedEx signature capture pad notifies the EPS to cut a DOC to the shipper using the PO/shipping invoice as evidence along with the recipient's signature verifying that they received the item. This feature helps facilitate easier, faster and more reliable E-commerce purchases without a credit card or the like. Alternatively, this can be used by a business where the billing address in the credit card file does not match the actual shipping address and you need to pay for delivery of an item ordered over the Internet—traditionally, shippers may not allow shipment to non-billing addresses. Shippers can trust that a DOC will be sent when the shipper drops of the package because having the customer sign for delivery confirms that they should be paid.

Additionally, the EPS can provide a conditional payment service where contract acceptance is required to cash the DOC. This mechanism is useful for promotional or marketing campaigns where a business can send to a consumer a promotional check which contains a contract on the back of the digital check. When a consumer (as payee) "signs" the check to deposit it into their bank account, the consumer is also agreeing to the contract, thus the company (payor) can begin to charge them for the product or service described on the promotional check. Conventional endorsement rules apply and an automated payment agreement is added to the endorsement line. This mechanism requires the receiver of the DOC to check a box and agree to payment terms before they can deposit or print the IRD. Note here, that the business doing the promotion is the original payor and the payee is the targeted customer but the goal is to let the business doing the promotion to setup an automated billing method using DOCs via agreement to the contract. So while the consumer (payee) initially gets to receive the DOC, once they agree, they may have future DOCs generated by the EPS payable to the original business promoter to pay for whatever monthly service they agreed to or signed up for. Note that the process started with the business as the payor but then they become the payee after the initial promotional DOC check is deposited and recurring payments are required to maintain the service or agreement.

Once received, the payee has several options on how to proceed with the DOC, such as deposit via email (step 124), conversion to ACH (step 126), printing an IRD (step 128), and the like. Once the payee has been notified, the payee uses the unique transaction ID (GUID) which was provided to them in the notification message to identify which specific DOC they wish to retrieve. The EPS uses the GUID to lookup the DOC transaction and determine how to authenticate the payee based on the authentication level chosen by the payor when sending the DOC (or setup by the payee as a condition for retrieving payments from the EPS under a specific name or ID). After satisfying the authentication and security tests, the payee has a choice in how to proceed with the depositing or clearing the payment for credit to their account. After retrieving the DPF record for the specific DOC (using the GUID), the EPS can generate a DOC image (in Check 21 image format) and display it directly onto a website page in order to present to the payee the specific check image for the payment they have received. Viewing a payment in check image form allows the payee to confirm that this is indeed the payment they expected, that it has the correct payee name or identifier on it, it has the correct value amount and has other optional business rules and processes attached to the payment which the payee can confirm prior to depositing the payment.

First, DOCs can be deposited electronically, such as through email (step 124). This provides a mechanism for deposit into a bank without the need to scan an IRD. For example, a payor can use a web appliance (e.g., embedded computer system) which processes SMTP email sent to a mailbox at a bank identified with a well known address such as "Deposits xyz.com" email inbox address. The bank or business can receive DOCs via email, and the appliance strips out the GUID from the DOC notification message, and generates an automated electronic deposit request or generates an actual X9 image cash letter for deposit and sends the file to the banking system for settlement. Thus, there is no human intervention—no opening of letters, no paper check or IRD scanning in order to deposit the check. A middle man service such as an EPCH can facilitate the clearing process of these automated deposits. Unlike one of the EPS methods where both payor and payee are humans interacting with the system; in this model, a payor pays the bill to the business via their public "deposit" email account and the appliance automates the electronic depositing of the DOC without humans involved. This replaces the traditional banking "lockbox" service where humans open up mail and scan a paper check to then ACH (ARC) the deposit into the businesses deposit account. This method is faster, easier, more secure and provides a lower cost method of electronic bill payment collection. Optionally, a payee can forward or "push" their DOC to a local merchant store to get instant cash (versus depositing and clearing) using traditional check cashing techniques and methods. Also, the EPS could permit a check cashing merchant to "pull" the DOC into their system so the payee can walk down the street to quickly "cash" the DOC. Also, the clearing/payment can be made faster via electronic deposit into the merchant's bank account so they have better "turn" on their inventory of cash.

Cash deposits could be made into a DOC account by using numerous "deposit only" accounts or special purpose one time accounts and the like at mainstream banks (i.e. popular banks with locations across the U.S.). If the EPS had accounts that customers could make cash deposits into, the EPS could allow almost everyone to deposit cash into their stored value account maintained by the EPS, and thus allow payors to quickly fund a DOC by using "walk-in" deposits of cash at a few accounts at the "top 10" banks. Deposit slips could be printed from the EPS website with the EPS DDA deposit account information pre-filled into the deposit slip, thus allowing DOC customers to walk into the nearest "top 10" bank branch and deposit cash to fund their next DOC. The EPS system could track these deposit accounts in real-time using the ATM network and know when a depositor went to a specific bank to fund a specific account with a specified amount given the deposit slip information via the DOC deposit slip GUID. Verification of this information reconciles the EPS bank account with the customer stored value account.

In another exemplary embodiment, the payee can convert a DOC into an ACH payment to clear through the ACH network (step 126). Here, the DOC item would be converted to an electronic payment under the ACH network rules, and clear through it. Alternatively, the EPS can perform an ACH to DOC conversion. Here, the EPS performs a reverse or "undo" ACH feature—normally checks are converted into ACH items but now the EPS can create a DOC from an ACH file. This is an "anti-POP" feature that allows banks or clearinghouses to re-route/re-claim ACH payment flow back into the check network because the payment is now a DOC (a real check). This also allows a business to do a "least cost" clearing method and take existing ACH payment flows and route them back into the checking "rail" network. Basically, the EPS takes the ACH file and extracts out the DDA (checking account) metadata to generate a DOC from the information that already exists in an ACH message. Additionally, the EPS can convert an ACH item to a paper check item. This is similar to ACH to DOC, but this truncates ACH back to a paper check. This is the opposite of POP and ARC.

Additionally, the EPS can provide a DOC lock-box service to replace traditional ACH check truncation mechanisms. Here, DOCs are electronically forwarded to banks after applying traditional payment "lock box" functions. This feature performs steps such as identifying which account numbers to apply to payments, verifying amounts, payees account, etc. This also allows high volume billers to easily receive DOCs and have traditional "lock box" services applied to DOC payments. This concept can apply to an Electronic Bill Presentment and Payment system or an EPCH system and the like.

The present invention supports a novel automated method for printing Check 21 compliant IRDs by payors using automated pre-filled in DOC forms. In an exemplary embodiment, the present invention supports form-fillable generated IRDs, such as through Adobe Acrobat PDF form reader programs and the like. A user goes to a website, fills in an EPS webpage form with their ABA routing number of their bank, and the service generates a "blank DOC template" saved in PDF form with intelligent macro features. This allows the EPS to get and correctly set the MICR font/MICR line in an IRD to the correct fixed position inside the IRD form layout. When ever the EPS generates the PDF form it can take the user provided ABA MICR line information and auto-generate it into the IRD which is stored as a PDF. The user downloads the PDF form to their PC and as needed, they open the PDF form, fill in the blanks for payee, amount, date, etc. and save or print the form as a single IRD check file. This file is an X9 IRD, with filled in data values, the check, which is drawn on the payors checking account and clears as a check using traditional paper check or Check 21 methods. The user can email this single PDF check file to the payee as an email attachment, because almost everyone has the free PDF viewer (or has access to it), the payee can easily open the file in their viewer, and can print the check for deposit—optionally the payee can fill in a deposit form attached to file, or email form to their bank for automatic deposit using the EPS deposit methods.

Additionally, the present invention contemplates a high-volume check printer method and system which creates full check images from DOCs. With this idea, DOCs have no need for pre-printed check stock—(used by high speed line printers where the paper has tear-off side strips for example). This method allows DOCs to be printed on "real check stock" for high speed IRD printing in order to become a normal paper check. For business check issuers, this gives them an in-house DOC printing service (or outsourced) that prints a DOC in paper form for any payee who does not have an email address on file. The paper check stock can include a barcode for a Check 21 IRD. For example, check printers like Harland or Deluxe can add barcodes to their "forms" to identify which layout and payor data was used to create that check. This eliminates some of the OCR labor required to convert a paper check back into a DOC. This method is a "half-way" step between the old paper Item Processing methods and an all digital DOC process. The barcode could be scanned to identify the check template and payor metadata, then the remaining fields would have to be Optical Character Recognition (OCR'ed) to find the amount, payee, date, etc. and both sets of data are merged into a single DOC record.

Figure 6:
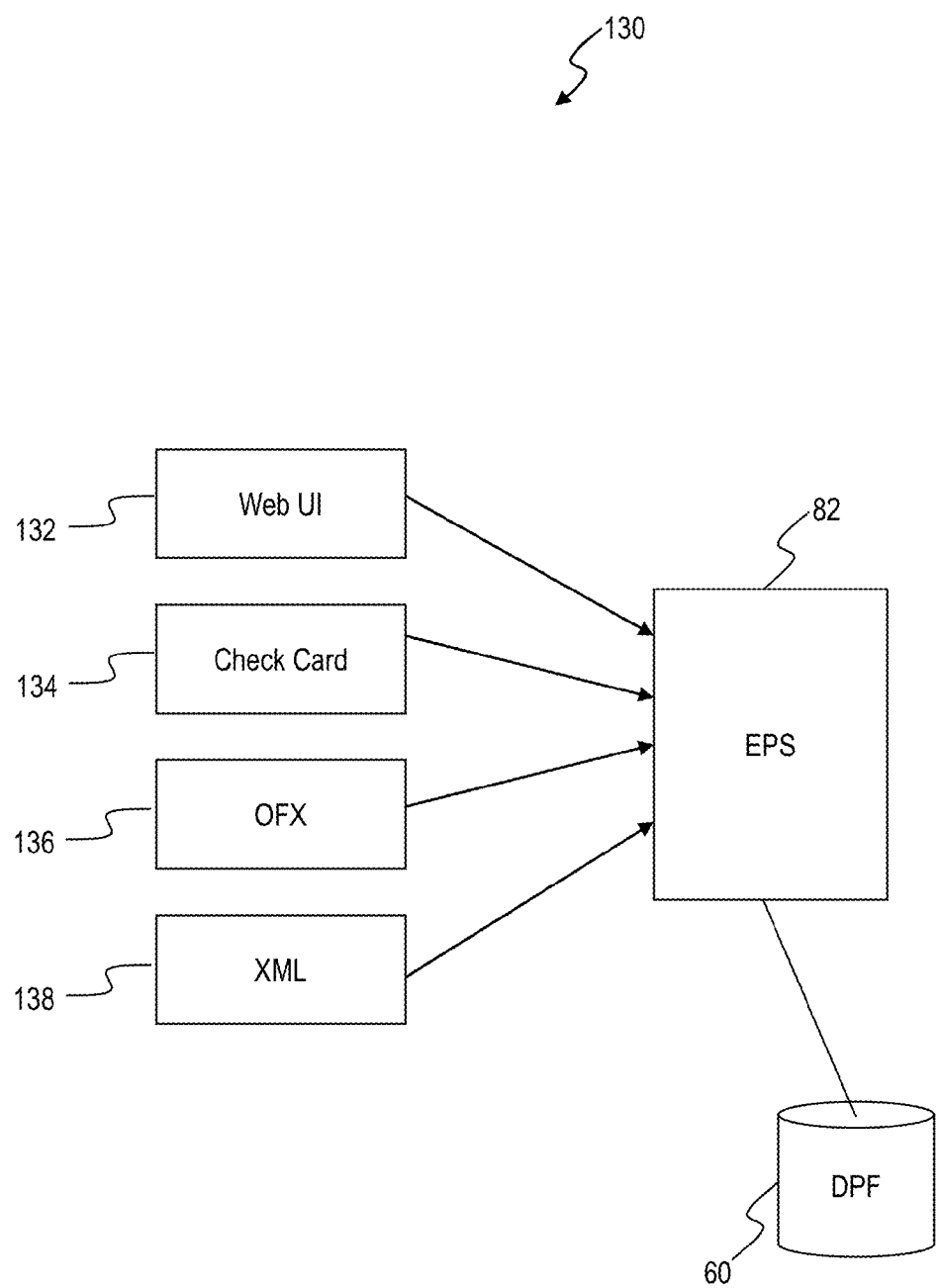
FIG. 6 is a flowchart illustrating DOC generation according to an exemplary embodiment of the present invention.

Referring to FIG. 6, DOC creation mechanisms 130 are illustrated according to an exemplary embodiment of the present invention. DOCs can be created through a variety of mechanisms, such as directly through the EPS 82 through a web User Interface 132, through a check card 134, through an OFX file 136, through an XML file 138, and the like. As described herein, the UI 132 allows users to log in the EPS 82 and directly create DOCs. The check card 134 allows payors to create DOCs at POS terminals. The OFX and XML file methods allow for automated or accounting software driven DOC creation input methods. Once created, the EPS 82 stores each DOC in a DPF 60 file.

The present invention can utilize the OFX (Open Financial exchange) 136 to allow third party software to create a DOC without users having to go to a website. Here, payors can use Quicken or QuickBooks, for example, as their primary payment issuing mechanism. For example, a payor would utilize some command, such as "Vendor Pay Bill" (or whatever command is used to issue checks), and the present invention utilizes a software plugin that captures check metadata from the software program and uses it to issue a DOC. Here, the software plugin writes out an XML or OFX format file that captures the check metadata and sends it via a web API into the EPS 82 service on behalf of the user. The OFX file has the same check creation instructions as a human utilizing the EPS UI, but this data is generated inside the software program (not the EPS website) and then saved to an OFX file and then uploaded to the EPS 82 to generate the DOC. Note, existing software does not need to be modified to support DOC creation. Rather, the present invention just uses the existing API "add-in" mechanisms to install a plugin that understands how to generate a DOC via standard OFX or XML files. In the reverse scenario, using the EPS 82 website, DOC creation steps can also generate an OFX file to update the local software accounting database with recently issued DOC payments so that they may be recorded and reconciled within the accounting or business software system. This means that the EPS 82 would generate an OFX file that a user would download into accounting software which contains instructions which the accounting system uses to update records.

Additionally, the present invention contemplates auto-DOC generation via XML EDI standards. EDI was the original purchase order/invoice automation method started back in the 1980's. Then in the late 1990's, businesses tried to improve their existing Supply Chain Management (SCM) functionality by integrating their Enterprise Resource Planning (ERP) systems with their SCM software but all that did was automate the Accounts Payable (AP) function—a business would still have to manually "cut a check" to pay for the automated invoice. By integrating DOCs into ERP or accounting software, high volume AP check issuers could automatically generate a DOC when they receive a properly formatted XML Purchase Order (P.O.'s) or Invoice. If proper XML EDI instructions are received (from a known registered supplier), an accounting system can automatically cut a "check" and generate a DOC on the fly, assuming that the managers of the business have set or allowed business rules to make this happen. This simplifies the Accounts Payable service and enhances EDI type of exchanges for B2B extranet scenarios between suppliers and customers. This EPS method is useful for "Just in Time" (JIT) inventory situations where manufacturers constantly re-order supplies as needed but vendors want to be paid faster as well, i.e. the EPS provides a "just in time payments" system to close the loop on exposed by the JIT inventory systems. This idea requires the EPS 82 to support some type of published or well known XML schema (s) for integration of PO's and Invoices with SCM and ERP systems.

Additionally, the present invention contemplates automated merchant processing for transaction risk placement. Here, this automated mechanism transfers payment risk when issuing a DOC. Essentially, at DOC creation time, payors are offered an optional feature of selecting from a list of institutions who are known to be willing to buy the risk that a transaction payment will go bad (for example think factoring, payment insurance or certified payments and the like). This works for payors certifying their DOC or for payees receiving either a high volume of DOCs or DOCs with large but risky payment amounts. For example, having payors "pay for insurance" on their DOCs (note insurance is instantly confirmed with the authorization of the transaction) should make payees more willing to accept DOCs as satisfaction of the debt. Thus, this service allows DOCs to be accepted by more people including businesses who never see the payor due to the disconnected nature of Internet based transactions (E-commerce) and particularly of DOC generation by some new EPS or EPCH service. Alternatively, for payees, the "risk transferring" institution can be selected based on the analysis of the transaction and their outstanding balance and their credit history. Thus, merchants could sell off their outstanding nightly "receivables" balance to get their money faster by accepting a "95% payment" from the factoring/risk taking institution. These mechanisms could be offered by the EPS and used in either DOCs or with other payment methods like credit cards or ACH. Using this mechanism, the EPS 82 could speed up the traditional "two day" ACH clearing process.

The EPS can support numerous usage concepts leveraging the flexibility of the check system and the requirements of E-commerce. For example, DOCs could be used as better coupons for immediate in-store credit. This allows merchants to issue "limited time" promotional "checks" as part of a sophisticated marketing campaign. For example a 10% off coupon for a new item can be sent to many users (new or existing customers) using a "DOC check" sent via email. The user could print the IRD and walk in to the store with the IRD coupon to buy the item. The coupon (an IRD with the items UPC barcode preprinted on the IRD) discount gets automatically applied at checkout by a POS terminal. The idea is to verify the credit value in the store (online or brick and mortar) at checkout using the UPC barcode and make a payment or receive a discount in a single step. Using this novel EPS method, any business can easily send out a rebate check to drive customers into the store to "spend" the check. At checkout, the POS inputs the GUID and a discount is applied. The GUID is canceled to eliminate duplicate coupons as well as provide merchants with an automatic "efficiency" rating and tracking system to show them who used the coupons, when, where etc—tying database marketing and data-mining to coupon present captured from POS data. This method can also be used to issue "store credit" or "scrip" that is good for in store use only, but it can also be traded to others if needed allow some external value to be kept (like the old Green stamps). A website or web service validates each "DOC" coupon at POS scanning, verifies it and automatically deducts the amount from the pre-funded DOC account setup by the manufacture at the EPS in order to credit the store's EPS DOC account. This provides faster payment to the store, easier and more accurate tracking to the manufacturer for each DOC coupon distributed with better security features given existing DOC GUID security.

Additionally, the EPS can offer DOCs which can be auto-filled by merchants, allowing the payor to sign and submit for payment. DOCs can be pre-filled by merchant with information and payee bank account information (acquired by the EPS from previous DOC payments or deposits) including customers previous selections for check issuing options (normally only elected by the issuer)—so the DOC is waiting for the customer and ready for them to "sign" or authorize the DOC. The merchant prepares the DOC and has it waiting for the payee to sign/issue.

For small and low risk amounts used in cross promotional campaigns, DOCs can also be printed in traditional store coupon form with a Universal Product Code (UPC) code representing the discount amount, e.g. 50 cents off some product. Here, a manufacturer can control the issuance just like a check including PPD (positive-pay) features. A buyer could take the DOC to the store, scan it at checkout, and deduct the amount. The value is transferred via the coupon network/rail/clearing system NOT the bank or checking system. This method converts DOCs to coupons and clears them via the traditional grocery store coupon system for reimbursement by the manufacturer or coupon issuer back to each store.

The EPS has additional methods to help fundraising efforts for charities, donations and the like. EPS generated DOCs offer superior speed and lower costs features to charities and non-profits which benefit from the reduced expenses (compared to credit cards), they also keep more of the donation compared with other alternatives, and they are easier (compared to ACH) and faster to receive. Thus an EPS service could be developed to utilize DOCs in an ASP model to bill church goers for regular tithing amounts such as weekly or monthly recurring payments plus automatically generate receipts (canceled checks) to prove the donation was made. The church member signs up using a church branded EPS website (ex. FirstATLChurch.PayBanc.com) and sets an amount and schedule to be "drafted" but sent as a DOC (not ACH item or credit card charge). Note, this can also work for colleges (e.g., alumni associations), other 503(c) charities (e.g., Red Cross), for membership drives (email a check to join), for one time disaster relief services, and the like. The EPS DOC method is safer than ACH and credit card methods, protects consumers and gives them control over how the check is written, while the charity gets a super low cost and efficient collection method.

EPS generated DOC methods could also be used for expense reimbursements systems. Here, DOCs and the EPS could integrate with existing expense reimbursement systems for easy, quick checks to employees (especially low value checks for office supplies—eliminates the need for petty cash in the business). Many ASP applications exist for expense tracking, and the like but they do not integrate with ERP/payroll services. Using the EPS, employees utilizing these services would not need to wait once or twice a month for the business to cut checks to receive their expense check. Also, DOCs and the EPS could integrate with payroll services for fast, efficient payroll checks (instead of ACH direct deposit). This can work better, faster and cheaper for small business than the traditional payroll services. The EPS payroll service can also tie into the optional data area on IRD to on print data such as year-to-date tax, withholding amounts, etc. and have the DOCS emailed to remote employees. Additionally, small businesses or home business payors could use the OFX integration described herein to automatically generate EPS payroll payments from their accounting software on a regular/scheduled basis. These methods offer low cost and flexible systems with total control by the business because the EPS allows them to issue the DOCs and direct where they will be sent—the EPS provides them full control over the DOC payments.

On a special but fun note, EPS generated DOCs can be attached to an electronic greeting card as embedded payments for birthday's, graduation gifts, etc. This allows EPS users to send greeting cards to people along with the ability to send money as DOCs along with the e-card. Paper cards have had an advantage of being able to attach cash or paper checks inside the document. Now with DOCs, the online greeting card systems can finally do the same thing for electronic cards.

An additional novel and innovative concept provided for by the present invention is the feature that the EPS can provide an efficient origination mechanism for small, micro payments. Utilizing an EPS web service either ACH or DOCs could be generated as the final payment mechanism for the micro payments. For example, slower clearing of small value payments may be acceptable to some; the problem in the industry has been how to allow a business to originate these small value payments efficiently/easily/automatically. For example, how would a traditional payment rail or EPCH allow a business to efficiently and cost effectively originate a 5 cent charge for viewing a single webpage news story per user per view? How would the business invoice the user or collect this small value payment from the user? Traditionally, generating an ACH item per small item is cumbersome and costly, and credit cards are too expensive. Thus, using DOCs or the efficient ACH methods discussed, the EPS service could clear the many small payments efficiently either as a single payment (billing the user for the total page views during their session) or optionally as individual small DOCs generated per page view (this assumes that the EPS or EPCH has an extremely cost efficient and automatic method for origination and settlement to avoid the clearing charges being greater than the single DOC payment value). The present invention could make a low cost deduction from each buyer into the sellers account. Also, the present invention could use a slower payments model when the clearing time is not critical, the EPS does not need always to generate a DOC, it could still use the improved ACH methods as an alternative. This micro billing and payment service utilizes the easy, efficient (web service), methods provided by the EPS and optionally can group or chunk the payments into batches (per user defined period). For example, the EPS could offer a virtual "Newspaper Boy" feature for weekly collection of web newspapers delivered by an ASP or online service. The EPS micro-payment method could also provide a unique form of payment, referred to herein as "web coins", which demonstrates that the EPS micro-payments webservice provides a virtual "coin box". The EPS service could collect nickel type payments deposited by payors utilizing EPS enabled E-commerce websites and provide the website business owners with collection services which deliver these webcoin payments on an efficient and regularly scheduled basis (ex. think of a web based coinbox that is emptied every week by batching the EPS DPF records into a single DOC delivered to the website owner).

In another exemplary embodiment of the present invention, the EPS can provide micro-loans to other EPS users easily and efficiently through DOCs. This method allows an EPS customer who has a stored value account to make a higher "yield" on their savings (stored value) in a DOC account. The idea is to allow the EPS user to loan out their excess EPS account balance each night like commercial paper loans in order to earn a higher interest rate on their deposits. This allows end users to participate in the "float" game, for example an EPS user can have an average weekly balance of $100 and decide to "loan" $50 out every week if they don't need it at a good interest rate. The "loan" is to another customer who needs a small but quick loan to cover a DOC payment (real fast—similar to overdraft protection concepts and the like). The customer agrees to pay nightly or weekly interest and the EPS system would lock them out of borrowing if they borrow too much (setting some consumer limit such as $100 maximum) or if their EPS tracked credit score falls below some limit. The micro-loan has a contract (tied to a DOC loan) and is paid back via a DOC that has workflow/escrow/conditional features enabled (i.e. the payor can't write other DOCs while they have an outstanding unpaid loan for example)—this helps the EPS to make sure that the micro-loan borrow will repay the loan quickly.

The DOCs and EPS enable other types of micro-payments electronically via checks. Traditionally, business resist writing checks for small amounts (under a $1 for example) as the cost to print and mail the check exceeds the value of the check. However, the EPS can enable a new form of "micro" payments suitable for these less than one U.S. dollar type payments such as quarterly dividend payments for small stock holdings. The micro payments can be made efficiently and easily with DOCs without the need for a new infrastructure. For example, sending a 50 cent check (e.g., for a dividend check) is now feasible because of the low costs of DOCS, thus these types of payments become more feasible or realistic to all business who need to make small payments plus the payees benefit because these small DOC payments can still clear through the existing check infrastructure. No postage is needed, no delivery costs, etc. thus this EPS service makes sub one dollar payments efficient and feasible without modification to either the payor or payees infrastructure.

DOCs can be created and then converted to cash using a truncation of the check into a money order. The EPS can offer other "check cashing" services and features which can be applied to simulate money order payments but with easier creation/authentication and security mechanisms. Creating a DOC, one of the choices can be to make a "Money Order" (MO) instead of a DOC. For a small fee, when the EPS sends the DOC style money order out to the payee/recipient, the payee has the option to direct the MO to be sent to a local store for immediate cashing. This saves time and effort, and allows the store to utilize the EPS provided identification methods using a PIN, etc. The EPS can also partner with postal service money orders (because there are Post Offices everywhere) or with financial services companies for Travelers Checks. The EPS could also partner with Banks to dispense cash for these "DOC to MO" conversions for a fee. Optionally, DOC can be converted into a more secure MO with specific payment instructions (PIN, who to pay, etc) so only the payee with proof of ID can walk in and get the money (even at a foreign bank)—this makes DOC based Money Orders work like a universal check.

Additionally, the EPS can provide an electronic bill presentment system with easy "auto pay" type features added to their electronic bill presentment (EBP) message. An online bill presentment vendor embeds a pre-filled in DOC inside the electronic bill presentment file sent to each customer (the payee is the customer of the EBP vendor). To pay the bill with a DOC via the EPS, the bill presentment recipient only has to click on the embedded DOC payee URL link to quickly and easily pay the bill (the URL link contains the DOC GUID) from their checking account. The biller has pre-filled their account info along with the customer's info into the pre-paid bill which is stored in a link in the EPS DPF. The DOC user receives a notification that they have a "bill" not a check so they go online to "authorize" the DOC transfer to pay the biller. This ties to conditional payments features and contracts, plus "file append" features—for example, the bill info is appended to the check/stub. This feature provides better features to bill payors than the well known alternative of establishing an ACH "auto-draft" contract where the customer (payor) has trouble trying to cancel the auto-draft when they cancel the service. Here, the customer authorizes the payment each month, thus when canceled, the EPS stops sending out bill notification to the payor, thus the original biller has no way to receive any type of automated payment. The person receiving the bill still has to authorize the creation of the DOC, this just automates and integrates bill presentment with DOC generation services provided by the EPS.

Existing online bill payment (OLBP) services (e.g., CheckFree) use ACH or paper checks, and the present invention allows the EPS to add DOCs as a new payment option with on-line bill pay. Users can choose this option to get enhanced tracking, security, conditional/contracts, etc. This mechanism adds value, keeps costs down (vs. paper check) and clears as a check, not ACH truncation. Additionally, this feature can also be used by a small bank that has an existing outsourced or hosted software solution to easily offer in-house OLBP to their customers. Effectively, DOCs and the EPS can provide an improved OLBP system with DOCs tied to paper bills for payment. A paper bill is printed with a DOC code that identifies the amount and who to pay (payee info). When the customer (payor) opens the bill, they will see the EPS code which allows them to go to the EPS enabled "online bank" service to generate a DOC payment. The customer enters the billing code to automatically have the amount, payee, account info, etc and the like automatically generated for them onto the live, online DOC form. This feature makes paying your bills very easy and fast—better than existing Online Bill Pay. Using this method, by entering one GUID the payor can automate everything, even if the monthly billing amount varies (existing OLBP makes you type in the amount, the EPS already knows this dynamic amount when it is coupled with EBP). The EPS is a new, novel, and open "anyone to anyone" payment service. Using DOCs, the EPS can offer online check issuing, different than Online Bill Pay. The EPS can also link to Online Bill Presentment systems and pay instantly, but the primary feature is online paperless Check 21 payments—not ACH transfers or Credit Card clearing.

Additionally, DOCs can be certified online. Using the EPS, either payor (pre-certified) or payee (after receiving) can decide to elect to pay to certify that the funds are good or guaranteed. The EPS can offer multiple levels of certification. Certification is tied to the bank account (DDA)—the EPS receives a request to certify and goes back to the issuing account, inspects the balance (e.g., this can be done via ATM network), and verifies funds (similar to credit card pre-authorization) or to collect the funds to ensure that the check will clear. For example, a user elects to do this by checking a box in an online form, this feature links to check control features and issuing control features. Current online payment systems do not certify single checks, instead they used stored value amounts to issue bank checks to avoid double debits on pre-certified checks. Thus the present invention can certify the DOC to be the functional equivalent of a bank DOC.

The DOC can also be used for online loan creation, tracking, and payment. This is primarily intended for personal and small business loans. This EPS process assists in the creation of the loan agreement, payment of the loan, tracking of the loan on-line, enables auto-payments through various methods, utilizes pre-filled in DOCs, etc. The DOC is tied to a loan document using a "contract" or conditional features which are attached to the DOC. This lowers the cost to issue loans because there would be an automated way to track and make payments.

The EPS can also tie into other E-commerce payment systems, such as Paypal and the like. Here, the EPS could front end a users PayPal account by using APIs to poll their account status, or initiate PayPal payments from the EPS using APIs instead of user input. This makes the EPS useful to the "die hard" PayPal users—allowing them to use a single EPS account without having to watch two payment accounts. The user would use EPS as their primary online payments service and instruct it on how to manage their PayPal or other stored value account. This feature can work for any type of online account, allowing the EPS to consolidate multiple money management services into one.

In another exemplary embodiment of the present invention, using a real "Check Card" operable to create DOCs, users can accumulate reward points for each DOC issued, the total number issued, the value issued, etc and many other metrics. This feature can tie back into the data collection/demographics feature so that merchants have a better idea of who their customers are.

DOCs can also be pre-funded, i.e. one time or multi-use, from a drawn down account. Here, users pre-fund a unique account, and the GUID for that account is then given to a creditor or business who bills regularly against the special account (for example, useful for retainer based services). Additionally, they can draw down on the account each month for "auto pay" type feature. Note, the EPS makes sure the balance either never goes below some threshold or it can go to zero and a new pre-funded account can be created periodically. This eliminates the ACH contract cancellation issues seen by users of existing auto pay services. This can be tied to the auto-replenishment features to refill accounts. This feature also secures the payor's checking similar to the new ACH credit push concept, the payor can safely put the money into a separate account that a creditor has access to (but does not allow them to access the primary account).

Rebates can be provided faster through the EPS. Using the normal "paper receipt" mail-in rebate process, a rebate processor can utilize the customers email ID typically provide on the rebate submission form to offer the customer an instant rebate. The EPS enables this service to the rebate process and their customer for a fee (typically paid through a discount on the rebate check) via an instant DOC sent via email versus having them wait for a 6 week delayed paper check. The customer incentive is to receive a faster (but discounted) rebate "check" via email instead of waiting 4-6 weeks to get a paper check. Incentives to manufacturers are better customer tracking (the EPS automatically notifies the them a list of who "opted-in" and can provide them with a list of email address to continue to market to them or optionally have the EPS send them a survey). Note that the loss of float by the rebate fulfillment service due to faster clearing is offset by the EPS offering to split the revenue generated by customers accepting the instant rebate.

Further, DOCs can be used to provide instant POS rebates using an email ID. Here, the present invention could allow manufacturers to issue DOC rebates to customers using the stores POS terminal. This method requires that the in-store POS system be configured to interoperate with the EPS and to collect required metadata such as the customer email address. Optionally, the rebate can be applied like a coupon by printing out the DOC as an IRD or online. Further, a user could transfer the rebate amount to somewhere else using their email ID to create a DOC which you send someplace else (instead of instant discount)—like "banking" a rebate to your piggybank.

DOCs are flexible through the EPS. For example, a payee using the EPS to retrieve a DOC could repurpose the DOC instead of cashing or depositing it. The payee does this by splitting up the total value they have received into multiple payments to other people (note all sub-payments must total 100% or the original DOC amount). The payee can split a DOC out to multiple people without cashing the check first. By doing this, both check issuer and original payee can get a complete history of the DOC (tracking of payees)—all data is kept in DOC DPF record to see where the DOC went—the audit trail is preserved. DOCs received as a "gift" can be converted (repurposed) and used to buy store credits for what is really wanted, such as with gift certificates and the like. Optionally, when a payor needs to "auto budget" their paycheck or spread X dollars across a list of payees this feature would come in handy. This feature will automate the spreading equally, or by percentage (user defined), etc. to all payees listed. The customer provides the payee list and the amount (total value) and how to split or spread (optional). Here, the payor is choosing how to spread the value versus in repurposing the payee chooses who to send value to (by forwarding the DOC on to a 3rd party).

The EPS can provide a smart checking account with auto-replenishment. This is not overdraft, but instead a user sets the threshold/limit where money is automatically pulled into the EPS account. Auto-replenishment ensures that a customers DOC account is kept "enabled" by automatically drafting an existing checking (DDA) account and storing the value in the EPS account or other stored value account service. This could be used to notify people that their Paypal account has run out of money (user set threshold), for example. This allows users to link to a stored value account to a real checking account and move money via ACH or check to their PayPal account in an automated manner—no user intervention or monitoring is needed. Note, the EPS could do this automatically, but PayPal does not, so this is a useful add-on to PayPal. This can work with any type of online service, front end aggregation and value mgmt.

Using a check card through the EPS makes it possible to spend "stored" DOCs received by a payee. These checks are waiting at the EPS, and they can then be cashed at merchants using their check card. Unlike third party checks, bad checks can be traced and collected back to the issuer if they are DOCs. This requires a Check Card to be updateable via RFID, smart card chip, or some "upload" mechanism and the like. The EPS can also store coupons. Coupons are stored in a database that have been accumulated through electronic purchases (DOCs or credit cards) which are redeemable when making a payment to a merchant selling the coupon bearing merchandise.

A customer can replenish their gift cards via an online DOC to gift card transfer. This is similar to DOC to ACH, DOC to Wire, etc. transfer, except that the value gets stored in an account accessed by a piece of plastic (e.g. Stored Value card) that is physically kept with the user or alternatively the value can be assigned to a specific merchant gift card. Either method allows the "card" to be used in stores by enabling the EPS to generate a non-changeable IRD made payable to the merchant only (this ties to true check card and DOC control features). This allows a user to easily take a "check" to the merchants to buy items but you do not have to pre-fill out a check. Using the EPS UI methods, a user types in their specific gift card or stored value card identification code, and the EPS transfers funds by linking the DOC to the internal store system (via EPCH if needed) to replenish value onto the card. Online replenishment saves time and is convenient, allows a "check" to be used in the store without the hassles of checks written at POS checkout or 3rd party endorsements or "cashing a check" at a store. Safety and security are also enhanced, as there is no need to carry a blank check with you to the store—a DOC is already "tied" to the plastic card when you get to the store to shop. Another use of this feature is to move a DOC onto a credit card to "store the value" onto an existing credit card balance.

The EPS can further provide a universal coupon card with a UPC barcode on a check card. Here, the EPS issues a secure plastic card with a UPC code that uniquely identifies the user, but also contains stored value, clears like a coupon, and deducts the amount from your bill. A business can issue the cards to preferred customers as rewards or they can give them away as gift cards (e.g., similar to Amex or Visa gift cards etc.), but they clear as coupons not as credit cards. This requires no verification, the card is secure to prevent fraud, and is kept by the merchant, batched up and sent back to GSF for reloading and reissuing. Also, this can be accepted everywhere that a UPC barcode can be scanned and deducted like a coupon.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An electronic payment system, comprising:
a data store configured to store a digital payment file;
a network interface configured to connect to a plurality of users; and
one or more processors connected to the data store and the network interface, wherein the one or more processors are configured to: receive input from a payor;
create a digitally originated check to one or more payees responsive to the input from the payor;
store the digitally originated check in the data store created based on the input of the payor in the data store as metadata in the digital payment file for further processing of the digitally originated check by the electronic payment system instead of printing a paper check or a check image file, wherein the digitally originated check comprises a legal check item created without an original paper check that is maintained electronically from creation to clearing in the electronic payment system;
notify the one or more payees associated with the created digitally originated check after the digitally originated check is created and stored that the digitally originate check is available in the data store of the electronic payment system;
track the digitally originated check for activity associated with the digitally originated check; and
process the digitally originated check by the one or more payees, wherein the one or more payees access the digitally originated check through the electronic payment system;
wherein the digitally originated check is created by the payor, and wherein the metadata comprises the payment instruction, a globally unique identifier, tracking information, and security information; and
wherein an output from the metadata in the digital payment file is interoperable with both paper and electronic clearing methods associated with check clearing systems;
wherein the electronic payment system further comprising:
accepting by both the payor and the payee a full set of warranties and indemnities applicable to banks of first deposit and clearing banks thereby enabling electronic presentment from payor to payee of the digital originated check under the Uniform Commercial Code and extending existing check clearing regulations between payor to payee and through associated banks of first deposit and clearing banks.

2. The electronic payment system of claim 1, wherein the digitally originate check is created through one of a software program, a web user interface, a check card at a point-of-sale terminal, an OFX file, a XML file, or an Application Programming Interface.

3. The electronic payment system of claim 2, wherein the OFX file and the XML file are created directly through one of a software program and a website, wherein the software program includes a plugin to generate the OFX and XML file, wherein the one or more processors are configured to create the digitally originated check from the OFX file and the XML file, and wherein the website is operated by the electronic payment system.

4. The electronic payment system of claim 1, wherein the digitally originate check is processed through one of forwarding the metadata to a bank of first deposit as an electronic Cash Letter File, printing a substitute check from the metadata, forwarding the metadata as another digitally originated check to a third party, and one of converting and truncating the digitally originated check to an Automated Clearing House item.

5. The electronic payment system of claim 1, wherein the data store further is configured to store statistics associated with the tracking of the digitally originated check.

6. The electronic payment system of claim 5, wherein the processor is further configured to provide a payment score from the statistics, wherein the payment score comprises a rating for a payor associated with the digitally originated check.

7. The electronic payment system of claim 1, wherein the digitally originated check is notified to a payee through one of an electronic coupon, an email greeting card, an email, an instant message, a fax, and an automated phone call.

8. The electronic payment system of claim 1, wherein the one or more processors are further configured to:
authenticating the digitally originated check with a public key cryptography system through the electronic payment system.

9. The electronic payment system of claim 1, wherein the one or more processors are further configured to:

set a time-to-live value associated with the digitally originated check, wherein upon expiry of the time-to-live value, the digitally originated check is no longer valid.

10. The electronic payment system of claim 1, wherein the one or more processors are further configured to:

provide transaction risk placement upon creating the digitally originated check.

11. An electronic payment method, comprising:

providing an electronic payment system comprising a computer system connected to a network and a data store configured to store a plurality of digital payment files;

providing a payor access to the electronic payment system through the network; receiving data from the payor associated with a payment from the payor to one or more payees;

creating a digitally originated check responsive to the data from the payor, wherein the data comprises payment instructions, wherein the digitally originated check is stored as metadata in the data store in a digital payment file of the plurality of digital payment files for further processing of the digitally originated check by the electronic payment system instead of printing a paper check or a check image file, and wherein the metadata comprises the payment instructions, a globally unique identifier, tracking information, and security information, wherein the digitally originated check comprises a legal check item created without an original paper check that is maintained electronically from creation to clearing in the electronic payment system;

notifying the payees of the digitally originated check after the digitally originated check is created and stored that the digitally originate check is available in the data store of the electronic payment system;

tracking the digitally originated check for activity associated with the digitally originated check;

providing the one or more payees access to the electronic payment system; and processing the digitally originated check by the one or more payees;

wherein an output from the metadata is interoperable with both paper and electronic clearing methods associated with check clearing systems;

wherein the electronic payment method further comprising:

accepting by both the payor and the payee a full set of warranties and indemnities applicable to banks of first deposit and clearing banks thereby enabling electronic presentment from payor to payee of the digital originated check under the Uniform Commercial Code and extending existing check clearing regulations between payor to payee and through associated banks of first deposit and clearing banks.

12. The electronic payment method of claim 11, wherein the access comprises one of a web user interface, a check card, and a software program configured to provide one of an OFX file, an XML file, or an Application Programming Interface.

13. The electronic payment method of claim 12, wherein the OFX and XML file are created directly through the software program, and wherein the software program includes a plugin configured to generate the digitally originated check through the electronic payment system using the OFX and XML file.

14. The electronic payment method of claim 11, wherein the digitally originate check is processed through one of forwarding the metadata to a bank of first deposit as an electronic Cash Letter File, printing a substitute check from the metadata, forwarding the metadata as another digitally originated check to a third party, and one of converting and truncating the digitally originated check to an Automated Clearing House item.

15. The electronic payment method of claim 11, wherein the digitally originated check is created as a coupon.

16. The electronic payment method of claim 11, further comprising receiving and storing statistics associated with the tracking of the digitally originated check.

17. The electronic payment method of claim 11, further comprising providing a payment score from the statistics, wherein the payment score comprises a rating for a payor associated with the digitally originated check.

18. The electronic payment method of claim 11, further comprising:

authenticating the digitally originated check with a public key cryptography system through the electronic payment system.

19. An electronic payment system, comprising:

a data store;

a network interface configured to connect to a plurality of users; and one or more processors connected to the data store and the network interface, wherein the one or more processors are configured to:

transmit and receive data with a first user of the plurality of users and confirm the first user's acceptance of a contract;

generate an electronic payment file comprising metadata defining a negotiable instrument from the first user to a second user based upon the data provided by the first user, wherein the electronic payment file comprises a legal check item created without an original paper check that is maintained electronically from creation to clearing in the electronic payment system;

transmit data to the second user that the electronic payment file is available after the digitally originated check is generated, wherein the electronic payment file resides in the data store and the second user is made aware of availability of the electronic payment file in the data store; and process, by the electronic payment system, the electronic payment file to provide a payment to the second user;

wherein the electronic payment system further comprising:

accepting by both the payor and the payee a full set of warranties and indemnities applicable to banks of first deposit and clearing banks thereby enabling electronic presentment from payor to payee of the digital originated check under the Uniform Commercial Code and extending existing check clearing regulations between payor to payee and through associated banks of first deposit and clearing banks.

* * * * *